US008902920B2

(12) United States Patent
Vokkarane et al.

(10) Patent No.: US 8,902,920 B2
(45) Date of Patent: Dec. 2, 2014

(54) DYNAMIC ADVANCE RESERVATION WITH DELAYED ALLOCATION

(75) Inventors: Vinod Vokkarane, Acton, MA (US); Arun Somani, Ames, IA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 13/533,355

(22) Filed: Jun. 26, 2012

(65) Prior Publication Data

US 2012/0327953 A1  Dec. 27, 2012

Related U.S. Application Data

(60) Provisional application No. 61/501,665, filed on Jun. 27, 2011.

(51) Int. Cl.
*H04B 7/212* (2006.01)
*H04J 14/02* (2006.01)

(52) U.S. Cl.
CPC ......... *H04J 14/0267* (2013.01); *H04J 14/0257* (2013.01); *H04J 14/0241* (2013.01); *H04J 14/0238* (2013.01)
USPC .......................................................... 370/442

(58) Field of Classification Search
CPC ............. H04L 12/2439; H04Q 3/0066; H04Q 2213/13523; H04W 28/16; H04W 28/20; H04W 72/1236; H04B 7/212
USPC .......................................................... 370/442
See application file for complete search history.

(56) References Cited

U.S. PATENT DOCUMENTS

| 6,205,154 | B1 * | 3/2001 | Schmidt et al. ............... 370/458 |
| 2003/0126246 | A1 * | 7/2003 | Blouin et al. .................. 709/223 |
| 2005/0063422 | A1 * | 3/2005 | Lazar et al. .................... 370/532 |
| 2007/0147248 | A1 * | 6/2007 | Kodialam et al. ............. 370/235 |
| 2009/0202013 | A1 * | 8/2009 | Sebastian ....................... 375/260 |

* cited by examiner

*Primary Examiner* — Mark Rinehart
*Assistant Examiner* — Ellen A Kirillova
(74) *Attorney, Agent, or Firm* — Milstein Zhang & Wu LLC; Joseph B. Milstein

(57) ABSTRACT

A method of scheduling data transmissions from a source to a destination, includes the steps of: providing a communication system having a number of channels and a number of paths, each of the channels having a plurality of designated time slots; receiving two or more data transmission requests; provisioning the transmission of the data; receiving data corresponding to at least one of the two or more data transmission requests; waiting until an earliest requested start time $T_s$; allocating at the current time each of the two or more data transmission requests; transmitting the data; and repeating the steps of waiting, allocating, and transmitting until each of the two or more data transmission requests that have been provisioned for a transmission of data is satisfied. A system to perform the method of scheduling data transmissions is also described.

10 Claims, 18 Drawing Sheets

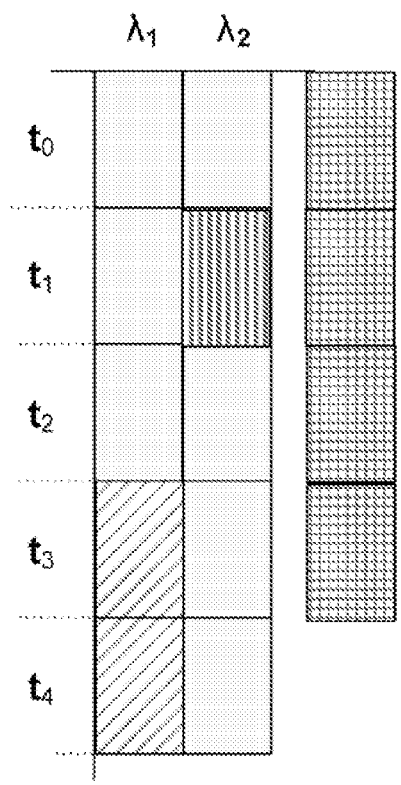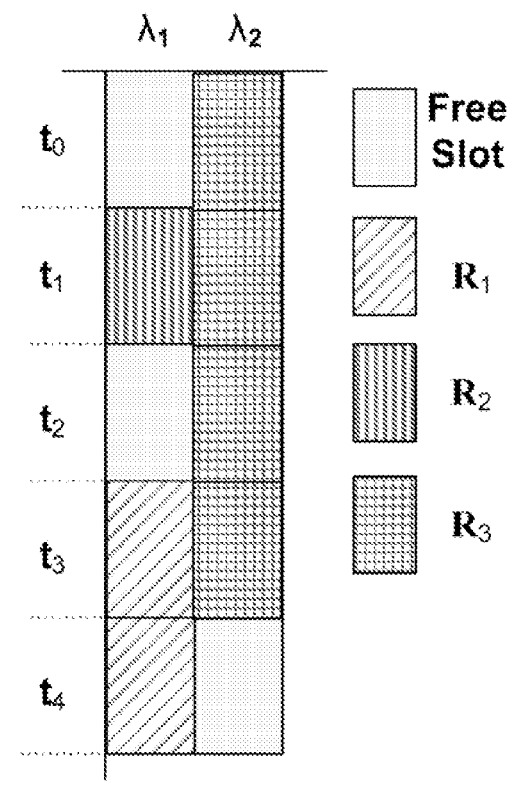
FIG. 3A ASAR    FIG. 3B SSAR
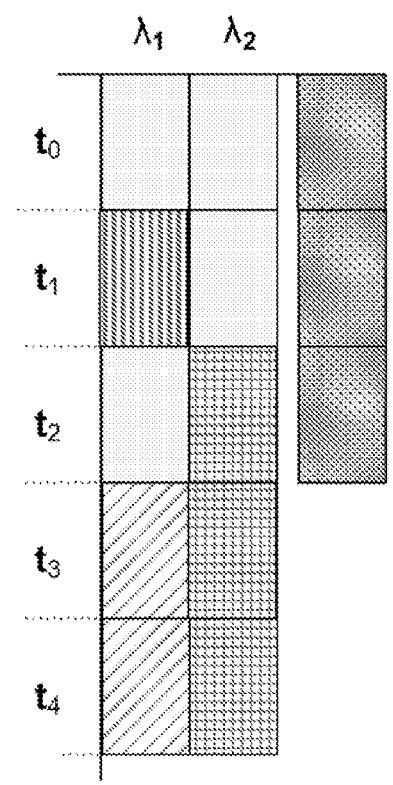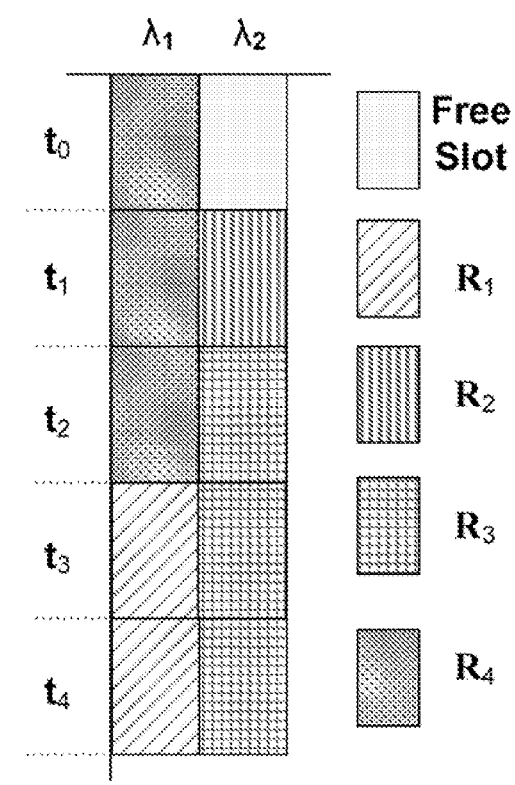
FIG. 3C ASAR    FIG. 3D SSAR Channel Allocation/Deallocation Method

Input: reservation list $t_0$, reservation list $t_1$
Output: channel allocation
Scan reservation list $t_0$;
while *(not-done)* do
    Pick the next reservation $r$;
    if *(number-of-slots > 1)* then
        number-of-slots = number-of-slots - 1;
        Link the reservation to slot $t_1$;
    end
    else
        c = allocated-channel;
        Update channel-status [c] = free;
        Add c to free-channel list
    end
end
Scan reservation list $t_1$
while *(not-done)* do
    Pick the next reservation $r$;
    if *(allocated-channel == null)* then
        Pick a free channel c from free-channel list;
        allocated-channel = c;
        Update channel-status [c] = in-use, request
        number, sub-request-number;
        number-of-slots = number-of-slots - 1;
    end
end

FIG. 5

Unicast

"s" connects to just one destination

Anycast

"s" selects one destination (k=1) from the group

Multicast

"s" connects to all nodes in the group (k = m)

Manycast

"s" connects to a subset of m (k <= m)

US 8,902,920 B2

DYNAMIC ADVANCE RESERVATION WITH DELAYED ALLOCATION

CROSS-REFERENCE TO RELATED APPLICATIONS

This application claims priority to and the benefit of U.S. provisional patent application Ser. No. 61/501,665, filed Jun. 27, 2011, which application is incorporated herein by reference in its entirety.

STATEMENT REGARDING FEDERALLY FUNDED RESEARCH OR DEVELOPMENT

The invention described herein was made in the performance of work under Department of Energy Grant DE-SC0004909, and is subject to the provisions of Public Law 96-517 (35 U.S.C. §202) in which the Contractor has elected to retain title.

FIELD OF THE INVENTION

The invention relates to scheduling multiple tasks given finite resources to perform the tasks in general and more particularly to scheduling data transmission on a communication network having fixed bandwidth resources.

BACKGROUND OF THE INVENTION

A Grid network is a collection of geographically distributed resources, such as storage nodes, super computers, and scientific equipment that are accessible to users over a network. These networks often deal with the transfer of large amounts of data (e.g., in the terabytes to petabytes range). A common traffic model used for such application is the dynamic traffic model. Requests are assumed to arrive sequentially, according to a stochastic process, and have finite holding times. The goal of the routing process is to minimize request blocking, where a user's request is primarily denied only due to lack of resources. Traditionally, the data transmission for an immediate reservation (IR) demand starts right after arrival of the request and the holding time is typically unknown. In contrast, an advance reservation (AR) typically specifies a data transmission start time that is sometime in the future and also specifies the desired holding time.

Advance reservation methods were originally proposed for electronic networks followed by optical networks such as the AR method described by J. Zheng, et. al. in "Routing and wavelength assignment for advance reservation in wavelength-routed WDM optical networks," Proceedings, IEEE International Conference on Communications, vol. 5, 2002, pp. 2722-2726 (2002). Since then, a number of continuous routing and wavelength assignment (RWA) heuristics based on static route computation have been proposed. These heuristics generally use the same basic structure, differing only in how they select the segment. They scan possible starting timeslots over all available lightpaths and choose a segment according to some criteria. Path switching for flexible advance reservation in electronic networks has also been proposed.

There is a need for a more efficient routing system and routing method for large data transfers over Grid networks.

SUMMARY OF THE INVENTION

According to one aspect, the invention features a method of scheduling data transmissions from a source to a destination, including the steps of: providing: a communication system having a number of channels and a number of paths, each of the channels having a plurality of designated time slots, and a bandwidth defined as the number of channels multiplied by the number of paths, and a bandwidth capacity defined as the bandwidth multiplied by the number of designated time slots; receiving two or more data transmission requests, each of the two or more data transmission requests designating a transmission of data from a source to a destination, each of the two or more data transmission requests including a requested start time $T_s$ of transmission and a requested number of time slots for the transmission of the data; provisioning the transmission of the data corresponding to each of the two or more data transmission requests via the communication bandwidth without designating a channel of the number of channels and without designating a path of the number of paths; receiving data corresponding to at least one of the two or more data transmission requests; waiting until a current time within a time interval t of an earliest requested start time $T_s$ of the two or more data transmission requests; allocating at the current time each of the two or more data transmission requests to a channel of the number of channels and to a path of the number of paths in a way which optimizes a use of the bandwidth capacity; transmitting the data corresponding to the at least one of the two or more data transmission requests that has been allocated on the allocated channel and the allocated path; and repeating the steps of waiting, allocating, and transmitting until each of the two or more data transmission requests that have been provisioned for a transmission of data is satisfied.

In one embodiment, the step of provisioning the transmission includes provisioning the transmission of the data during a request provisioning phase.

In another embodiment, the step of allocating includes allocating at least one of the two or more data transmission requests during a request allocation phase.

In yet another embodiment, the step of providing a communication bandwidth is performed using an optical communication network.

In yet another embodiment, the step of providing an optical communication network is performed using an optical communication network having wavelength division multiplexed transmission capability.

According to one aspect, the invention features a system for provisioning data transmission from a source to a destination which includes a communication system having a number of channels and a number of paths. Each of the channels having a plurality of designated time slots, in which a communication bandwidth is defined as the product of the number of channels times the number of paths and a bandwidth capacity is defined as the product of the bandwidth times the number of designated time slots. A processor has instructions provided on a machine readable medium. The processor is configured to perform the following steps when the instructions are operative: determining the communication bandwidth and the bandwidth capacity; receiving two or more data transmission requests, each of the two or more data transmission requests designating a transmission of data from a source to a destination, each of the two or more data transmission requests including a requested start time $T_s$ of transmission and a requested number of time slots for the transmission of the data; provisioning the transmission of the data corresponding to each of the two or more data transmission requests via the communication bandwidth without designating a channel of the number of channels and without designating a path of the number of paths; receiving data corresponding to at least one of the two or more data transmission requests; waiting until a current time within a time interval t of an earliest requested start time $T_s$ of the two or more data transmission requests; allocating at the current time each of the two or more data transmission requests to a channel of the number of channels and to a path of the number of paths in a way which optimizes a use of the bandwidth capacity; transmitting the data corresponding to the at least one of the two or more data transmission requests that has been allocated on the allocated channel and the allocated path; and repeating the steps of waiting, allocating, and transmitting until each of the two or more data transmission requests that have been provisioned for a transmission of data is satisfied.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 3A to FIG. 3D show time-slot time-lines and provisioning and allocation examples for the ASAR and the SSAR methods.

FIG. 5 shows one example of pseudo code suitable for performing channel allocation according to principles of the invention.

DETAILED DESCRIPTION

We describe hereinbelow, a new continuous advance reservation process that checks all of the possible slots (e.g., time-slots) in a requests's horizon. This description presents a new approach to the all-slots advanced reservation (ASAR) process such as was described by Charbonneau, et. al. in "Dynamic Non-Continuous Advance Reservation over Wavelength-Routed Networks," University of Massachusetts Dartmouth, Computer Science, Master's Thesis, September, 2010.

A data transmission time is typically time slotted and each dynamic request typically uses multiple contiguous time slots on the same wavelength path. Traditional advance reservation can lead to resource fragmentation where small gaps in wavelength usage cannot be utilized. Our new system and method does not create any fragmentation as a result of delayed resource allocation. If a gap is created, it is because there is no request to use a particular time slot. We overcome unnecessary blocking by allocating a "channel" (e.g. a wavelength path or light path), by using a two step process in which the channel is allocated, typically at a later time, when the request is actually being served. We refer to the new system and method according to invention as a single slot advance reservation (SSAR) system and method. As described in more detail hereinbelow, SSAR simplifies control of the process. We also describe hereinbelow how the SSAR system and method out-performs existing ASAR methods and the associated continuous flexible advance reservation heuristics.

Single Slot Advance Reservation (SSAR) System and Method General Approach

Figure 1:
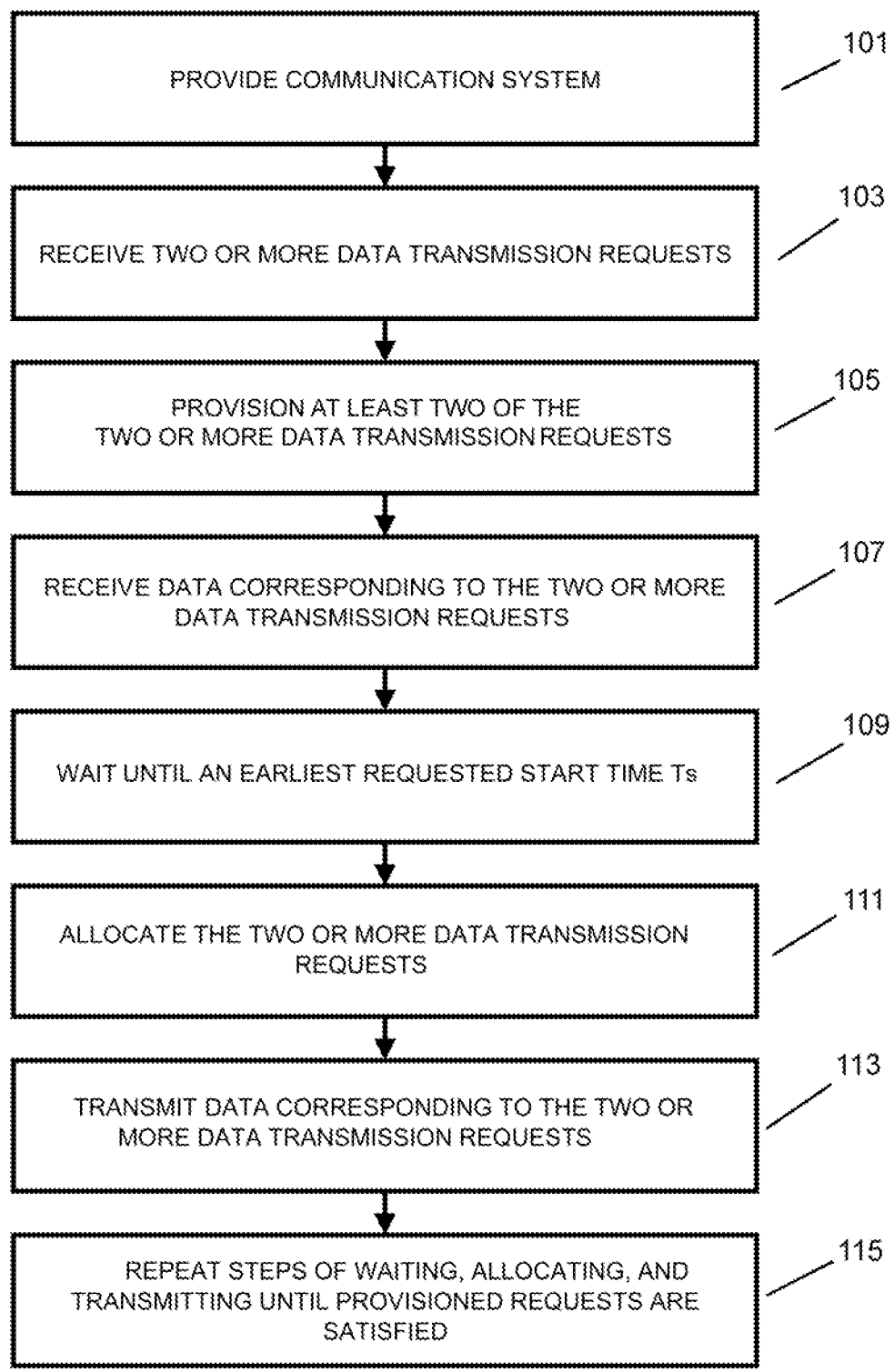
FIG. 1 shows a flow chart of a generalized view of the single slot reservation method according to the invention.

FIG. 1 shows a flow chart of a generalized view of the single slot reservation method according to the invention. The generalized SSAR method of scheduling data transmissions from a source to a destination, includes the steps of providing a communication system (101) having a number of channels and a number of paths, each of the channels having a plurality of designated time slots, and a bandwidth defined as the number of channels multiplied by the number of paths, and a bandwidth capacity defined as the bandwidth multiplied by the number of designated time slots; receiving two or more data transmission requests (103), each of the two or more data transmission requests designating a transmission of data from a source to a destination, each of the two or more data transmission requests including a requested start time $T_s$ of transmission and a requested number of time slots for the transmission of the data; provisioning the transmission of the data (105) corresponding to each of the two or more data transmission requests via the communication bandwidth without designating a channel of the number of channels and without designating a path of the number of paths; receiving the data (107) corresponding to at least one of the two or more data transmission requests; waiting until a current time within a time interval t of an earliest requested start time $T_s$ (109) of the two or more data transmission requests; allocating at the current time (111) each of the two or more data transmission requests to a channel of the number of channels and to a path of the number of paths in a way which optimizes a use of the bandwidth capacity; transmitting the data (113) corresponding to the at least one of the two or more data transmission requests that has been allocated on the allocated channel and the allocated path; and repeating the steps of waiting, allocating, and transmitting (115) until each of the two or more data transmission requests that have been provisioned for a transmission of data is satisfied.

In the description which follows hereinbelow, the step of provisioning the transmission generally takes place during a "request provisioning phase" (RPP), and the step of allocating generally takes place in a "request allocation phase" (RAP).

While the method is believed to be generally applicable to any type of scheduled multiple activities, in the context of data transmission, it is believed to be advantageous particularly in the field of optical communication, such as pertains to data transmission over an optical network. Such optical networks typically use a multiplexing scheme to afford more channels than the number of optical fibers present in any given fiber optic cable. For example, one such multiplexed optical network scheme which is suitable to provide additional channels per optical fiber for the inventive method is an optical communication network having wavelength division multiplexed (WDM) transmission capability.

Figure 2:
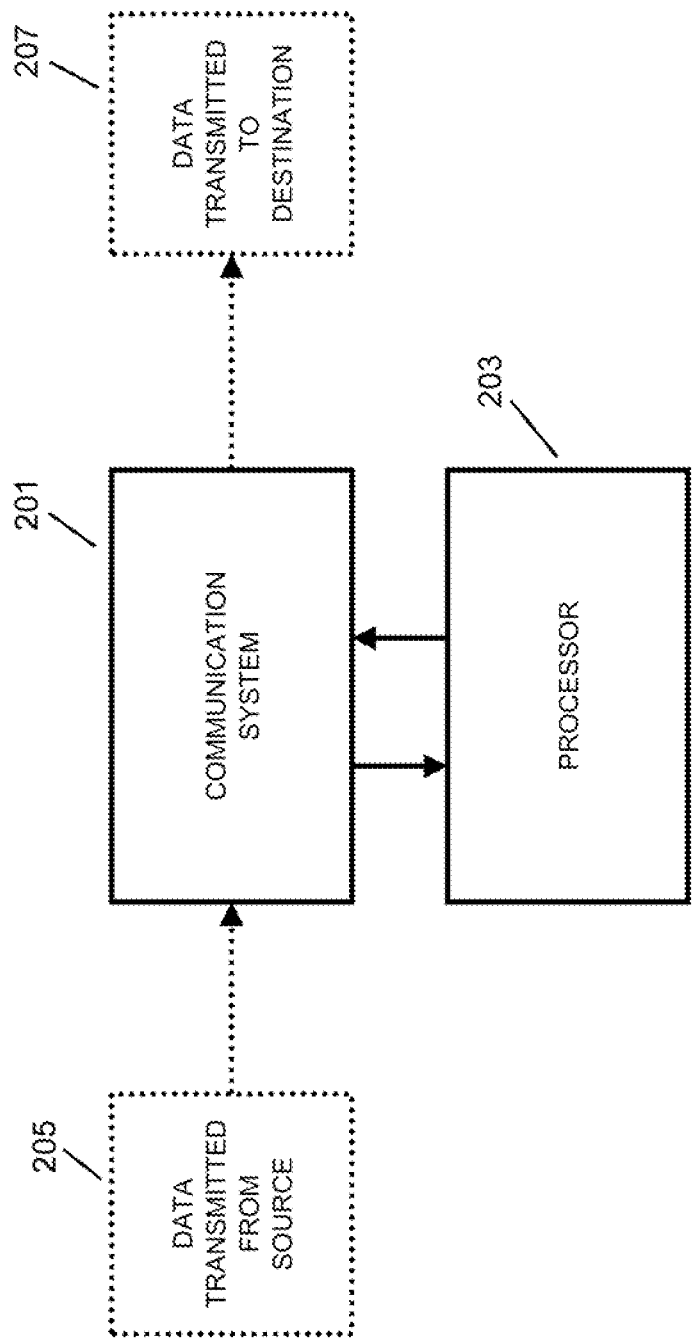
FIG. 2 shows an overview block diagram of a system suitable to perform the inventive method.

FIG. 2 shows an overview block diagram of a system suitable to perform the inventive method. A system for provisioning data transmission from a source to a destination, using the SSAR method typically includes a communication system (201) having a number of channels and a number of paths (not shown in FIG. 2), each of the channels has a plurality of designated time slots, in which a communication bandwidth is defined as the product of the number of channels times the number of paths and a bandwidth capacity is defined as the product of the bandwidth times the number of designated time slots. A processor (203) has instructions provided on a machine readable medium. The processor is configured to perform the following steps when the instructions are operative: determining the communication bandwidth and the bandwidth capacity; receiving two or more data transmission requests, each of the two or more data transmission requests designating a transmission of data from a source (e.g., 205) to a destination (e.g. 207), each of the two or more data transmission requests including a requested start time $T_s$ of transmission and a requested number of time slots for the transmission of the data. The generalized SSAR steps are as described hereinabove, provisioning the transmission of the data corresponding to each of the two or more data transmission requests via the communication bandwidth without designating a channel of the number of channels and without designating a path of the number of paths; receiving data corresponding to at least one of the two or more data transmission requests; waiting until a current time within a time interval t of an earliest requested start time $T_s$ of the two or more data transmission requests; allocating at the current time each of the two or more data transmission requests to a channel of the number of channels and to a path of the number of paths in a way which optimizes a use of the bandwidth capacity; transmitting the data corresponding to the at least one of the two or more data transmission requests that has been allocated on the allocated channel and the allocated path; and repeating the steps of waiting, allocating, and transmitting until each of the two or more data transmission requests that have been provisioned for a transmission of data is satisfied.

Comparison of SSAR with all-Slots Advance Reservation (ASAR)

Next, we discuss issues related to the prior art ASAR process and then compare a prior art ASAR method to an SSAR system and method according to the invention. Exemplary embodiments of a SSAR control process and the corresponding exemplary data structures suitable for use in an SSAR system and method according to the invention are described. Also, the performance of the inventive SSAR system and method is compared to the performance of an ASAR process of the prior art.

ASAR

An all-slots advance reservation (ASAR) process of the prior art assumes that a fixed number of precomputed wavelength paths exist between a source and a destination. Each pre-computed path is assigned a route and a wavelength and is referred to as a channel. Each channel is divided into time slots that are time synchronized with each respect to each other. An incoming request is assumed to use a set of contiguous slots. Thus a cross product of all pre-computed channels (paths) and future time-slots form the total available resource pool. The ASAR process keeps track of channels-time slots for the advance reservation period.

Upon arrival of a request for service, the ASAR process checks the availability of the requested time slots for all channels starting with the requested start time slot. It chooses a channel that fits the best for the request in hand. Given all starting time and channel combinations, there may be multiple potential channels to select from. ASAR methods use a Best-Fit approach. If time slots are available, then it immediately books/reserves the entire duration of the request and notifies the source that the request is accepted by returning a valid non-empty schedule. The reserved time slots on the selected channel are also reserved. If the time slots are not available then the source is notified that the request is blocked.

Checking the availability of time slots on wavelengths and scheduling reservations are intertwined. The controller needs to check all existing schedules to accept/reject a request and then to schedule the channel for the new reservation request. Thus, the ASAR methods use relatively complex processes. ASAR performs well if the book-ahead time is a constant, such as when a request must arrive, say k slots in advance of the requested slot. However, if the requests arrive with variable book-ahead times, then the ASAR method may lead to higher blocking. The higher blocking is a direct result of preallocation of the channel. The single-slot advance reservation (SSAR) system and method described herein solves the problem of blocking caused by channel preallocation.

Before describing the SSAR process in more formal terms, we first use examples to demonstrate the shortcoming of the ASAR process. The following examples illustrate the problems of blocking (e.g., blocking using ASAR methods of the prior art) as related to preallocation.

Problem with Preallocation of Channels in ASAR

Suppose the requests (e.g. for data transmission) are denoted by using a 3-tuple, <number, starting slot, # of slots>, where number is the dynamic request identifier, starting slot is the earliest slot that the request can use in the future, and # of slots is the request duration in units of slots. Note that the book-ahead time (in terms of slots) for each request can be computed implicitly as request starting slot-arrival slot.

FIG. 3A to FIG. 3D show time slot time lines and provisioning and allocation examples for the ASAR and the SSAR methods. For example, consider a case where there are two channels (e.g., $\lambda_1$ and $\lambda_2$) and the system state is currently prior to time slot 0 ($t_0$). A request number 1 arrives with starting slot number 3 and number of slots requested 2, or <1,3,2>. Suppose, for example, that channel 1 is allocated (FIG. 3A). Next, a second request <2,1,1> ("R2"—second request, starting slot 1, 1 slot to be used) arrives. There are two cases. Suppose, the second request is allocated channel 2 (FIG. 3A). In this case, if a third request <3,0,4> arrives (FIG. 3A, right side), it is blocked as shown in FIG. 3A. Without preallocation the third request would not have been blocked, as two channels are at most needed in any slots and there are two channels. Alternately, suppose now that request 2 is allocated channel 1 (FIG. 3B). In this latter case, suppose a third request <3,2,3> arrives using the SSAR method (FIG. 3B). The third request can now be allocated on channel 2.

Now, turning to FIG. 3C and FIG. 3D, suppose a fourth request "R4"<4,0,3> arrives. As shown in FIG. 3C, according to the ASAR method of the prior art, the fourth request would have to be blocked. However, using the inventive SSAR method without preallocation (FIG. 3D), the fourth request "R4" would not be blocked. Thus, a delayed allocation of the channel using SSAR according to the invention, leads to an efficient solution and solves the problem of blocking as related to preallocation. In the simpler case where the book-ahead time for all the requests is constant, the ASAR process can work well, but never better than the SSAR method.

Single-Slot Advance Reservation (SSAR)

We have developed a new two-phase resource provisioning and allocation process called single-slot advance reservation (SSAR). The inventive process solves the problem of blocking as related to preallocation by the use two phases: 1) a request provisioning phase (RPP) and 2) a request allocation phase (RAP). To demonstrate the process, we consider the same scenario which was described hereinabove with regard to ASAR. As before, requests are assigned one of the many wavelength paths available between a source and a destination and each of these paths is time slotted. An incoming request specifies how many (multiple) time slots are needed, starting with a specific time slot. The corresponding data transmission which eventually follows preferably should use the same wavelength path during the entire duration of the request. A request is either accepted if the necessary resources (e.g. a starting slot and a number of slots for a transmission of data) are available or is blocked if the resources needed to fulfill a particular request are not available.

In the request provisioning phase, the SSAR system and method only checks whether or not the request can be provisioned without doing any actual resource allocation. If the request can be provisioned, then when as the clock advances towards the request's start time, a single time-slot is reserved for this request, while keeping the future time slots open for reservation. The SSAR approach of separating the provisioning step from the allocation step can be used to guarantee that a request continues on the same channel. An exemplary SSAR controller data structure and process suitable to perform the SSAR method is described in more detail hereinbelow.

Figure 4A:
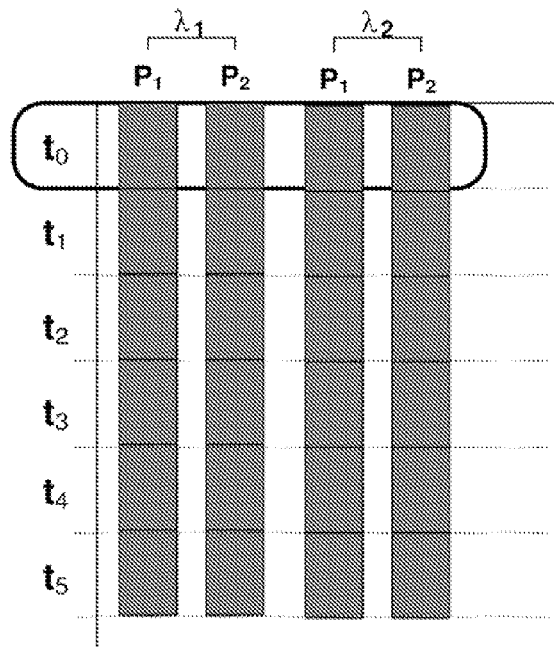
FIG. 4A to FIG. 4D show time-slot time-line diagrams of a single-slot advance reservation for two paths (P1, P2) where each path includes two channels ($\lambda_1$ and $\lambda_2$).
Figure 4B:
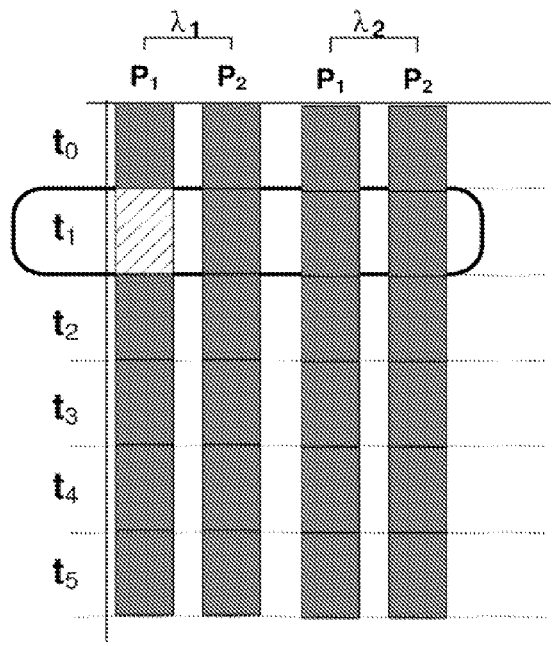
Figure 4C:
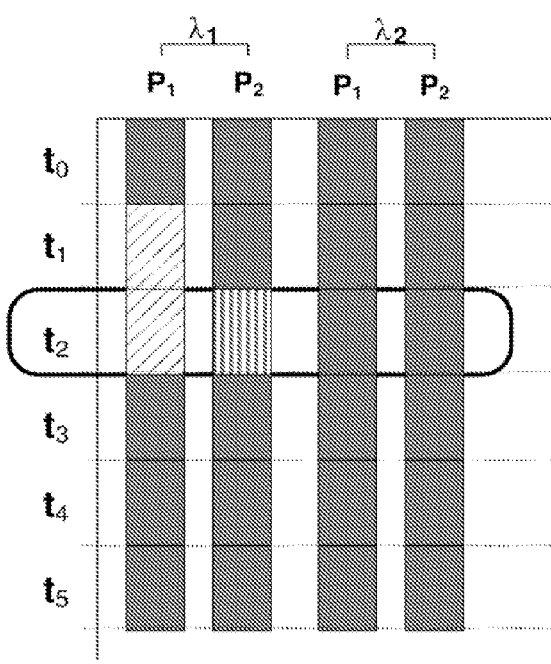
Figure 4D:
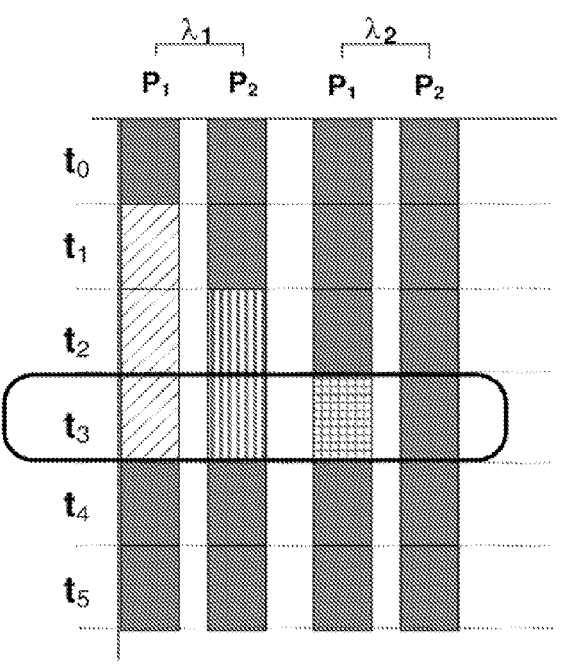

FIG. 4A to FIG. 4D show time slot "time line diagrams" of a single-slot advance reservation for two paths (P1, P2) where each path includes two channels ($\lambda_1$ and $\lambda_2$). FIG. 4A to FIG. 4D depict how the slot assignment process performs as time progresses (i.e., from time slot $t_0$ to time slot $t_3$). The blocks represent either time slots available or time slots reserved. The example uses three requests <1,4,1> ("R1"—request one, start time slot 4, one slot needed), "R2"—<2,2,2>, and "R3"—<3,3,13>. Each request is successively routed onto a separate channel one at a time and continued on that same channel. Using the same approach as in the first example, the requests will be routed so that requests 2 and request 1 are routed on channel 1 (FIG. 4B, FIG. 4C) and request 3 is routed on channel 2 (FIG. 4D). Note that FIG. 4D ends at time slot $t_3$, and the remaining 12 contiguous time slots of the 13 slot "R3" request are not shown in the figures.

Thus, it can be seen that the SSAR system and method performs better in comparison to ASAR. It also reduces the complexity of the scheduler. SSAR keeps track of the number of channels available in all time slots in the first phase and allocates resources on a single-slot reservation basis in the second phase. A system using this inventive separation of the provisioning and allocation steps has less scheduler control complexity and can accommodate more requests. Such a centralized scheduler implementation is more scalable. Also, since signaling is performed only when a request is started and terminated, the SSAR method does not increase signaling needs.

SSAR Centralized Scheduler

The controls for the resource provisioning phase (RPP) and for the resource allocation phase (RAP) for a request are independent of each other. The RPP only considers if a channel is available in all requested slots to serve the request as needed. Then at a later time, RAP allocates the actual channel to be used. RAP also guarantees that each request is allocated the same channel throughout its contiguous lifetime.

We now define a few terms and relationships used in the description which follows hereinbelow. The current slot number is numbered 0. The starting time of a reservation is maintained with respect to the current time slot. Thus as time advances, the relative starting time of a request approaches 0, and when it becomes 0, the request is served in that slot. The control system keeps a global slot counter which is set to zero at the starting of the system. A request is made using the start time value synchronized with the global slot counter. For the purpose of control, the system converts the start time to relative time with respect to current slot (0). To illustrate this conversion, suppose the global slot time counter has a value of $t_g$. An incoming request r arrives with a start time, $t_r$ and the number of slots needed, $s_r$. Then the relative start time for this request would be set to $t_r-t_g$. The request will be active from slot number $t_r-t_g$ to slot number $t_r-t_g+s_r-1$. The request numbers (modulo some large number) may be assigned by the system to an incoming request to keep track of other parameters of the requests. We only keep track of the request number. For simplicity, other information which does not impact the centralized scheduling process is left out of the description which follows.

Data Structures and Rationale

In order to implement RPP, the centralized scheduler has to maintain the following data structures:

Slot Occupancy Counters (SOC)

The process defines a number N of them, where N is the horizon or the number of slots for which reservation can be made currently. The first slot or the current slot is referred to as $t_0$ and next N−1 slots are referred to as $t_1$ to $t_{N-1}$. The maximum value any SOC can store is same as the maximum number of channels available. For example, for M channels, log M bit counters would be sufficient. Logical slot numbers automatically advance (go down) as the global slot counter increases (since the current slot is always numbered 0). Reservation table (or reservation lists)

All reservations are stored in a request table that may store several parameters associated with the request. However, for the purpose of the control, we maintain one reservation list (assumed to be a linked list) for each slot, i.e., $t_0$ to $t_{N-1}$, each with up to M entries, where M is the number of channels available for allocation. In reality, the number of entries in the list is no more than the total number of outstanding reservation for that slot (see hereinbelow for more explanation). This number of entries is large enough to avoid blocking due to the lack of space in the reservation table. Each entry stores the requests that are to start in that slot.

The format of each entry in the list is <reservation-number, sub-reservation-number, # of slots, allocated-channel>. Whenever a new reservation $<r, t_r, s_r>$ is made, the reservation-number is set to r, the sub-reservation-number is set to 0, the reservation-starting-time is not stored, but the entry is stored in the list $t_r-t_g$ (recall $t_r>t_g$), and number-of-slots is set to $s_r$. When a channel is allocated to this request, the channel-number-allocated is set.

Since the logical slot number advances automatically, the reservation lists are automatically renamed. Since we do not keep track of reservation list of logical slot numbers prior to $t_0$, the list for slot 0 is updated to carry forward all continuing requests. The process to carry out this task is described hereinbelow in more detail.

The table can either be maintained in the order of starting times or in the order of arrival of the AR requests. In the first case, it is easier to identify requests that need to be scheduled in the next time slot. In the latter case, all table entries are scanned to identify which requests need to be scheduled. In either case all table entries are updated. The way we choose is typically closer to the first way, as it not only identifies request starting in that slot but also makes updating easier. First we do not need to update the starting time as the relative slot number is automatically updated with the global slot counter. Therefore an implied sorted order offers this particular advantage. In some embodiments, we can also maintain table entries as a linked list. Each new entry is appended at the end of the list as it does not matter in what order channels are allocated, since all accepted requests will be allocated a channel. Each time a request is completed, the request entry is dropped. Entries in the tables/lists are updated in every slot as described.

Channel-Status

For each channel, a status of channel is set to be free or in-use. If the channel is in-use, then additional information about the request, e.g., sub-request, etc., is also maintained. In some embodiments, this information can be kept in two lists. One list can be in an array form Channel-Status [M], where information about each channel, i.e., in use or free, request and sub-request number being served on the channel, and when it will become free is stored. The last piece of information is redundant and is kept for monitoring purposes only. The second list can be a linked list of free channels, Free-Channels. When a channel is released, its number is added in the list. A Channel-Status array can also be updated as free. A channel allocation process picks up one of the free channels, removes it from Free-Channels, and then allocates it for communication and updates Channel-Status array appropriately.

Advance Reservation Requests

Requests can be of the following three types: (a) a simple request r asking for $s_r$ contiguous slots starting at slot $t_r$; (b) a multiple slot request $r_m$ asking for m channels for $s_{r_m}$ contiguous slots starting at slot $t_{r_m}$; and (c) a non-contiguous request $r_n$ asking for one channel for $s_{r_n}$ slots starting at slot $t_{r_n}$ and finish before end slot $e_{r_n}$.

A simple request of type (a) will be handled in the way as described below under resource provisioning and resource allocation paragraphs. The request is accepted only if a slot can be made available to it from slot number $t_r-t_g$ to slot number $t_r-t_g+s_r-1$.

The request of type (b) will be accepted only if m channels can be allocated to it from slot number $t_r-t_g$ to slot number $t_r-t_g+s_r-1$. Otherwise, the request is rejected. The control system checks for availability of m slots instead of one slot, as would be the case for a request of type (a). If the request is accepted, this request will be sub-divided into m sub-requests and inserted in the reservation list as such. The sub-reservation-number field is assigned values of 1 to m, respectively, to distinguish among them.

The request of type (c) can also be handled in the same way, except that the control system will consider slots from $t_{r_n}$ to slot $e_{r_n}$ and accept the request if and only if it can find $s_{r_n}$ slots in that interval that are available. These slots can be selected in more than one way, such as by using the first available slots, using the least-used slots, or by using the last available slots. Search processes suitable for use in all of these cases are well known in the art, and therefore are not discussed here. After the slots that are to be used are determined, the request is sub-divided into multiple sub-requests. The sum of the slots used for all sub-requests equals $s_{r_n}$. Each sub-request has a different starting slot number that corresponds to the available slot location identified in the previous step. To illustrate the process, suppose a request r calls for 5 slots starting with slot location 2 and completion before slot number 11 (i.e. the time frame of slot 2 to slot 10). Suppose the slot finding process identifies that slots 3,4,6,7, and 9 are free. Then this request is subdivided into three sub requests <r,3,2>, <r,6,2>, and <r,9,1> with sub-request numbers, 1, 2, and 3, respectively. If less than 5 slots were available, then the request would have been rejected.

Notice that the process to handle all reservation therefore becomes equivalent to handling a request of type (a). Therefore in the following description, we assume that all requests are of type (a).

Resource Provisioning Phase

When an AR request $<r, t_r, s_r>$ arrives, (or other requests are converted to such requests), SOCs (slot occupancy counters) starting from $$t_{t_r-t_g} \text{ to } t_{t_r-t_g+s_r-1}$$

are checked to see that each of them has at least one channel free in the RPP. If so, the request is accepted, is included in the request list $t_r-t_g$, where $t_g$ is the global slot counter. Recall that this is the relative slot number. SOCs for slots $$t_{t_r-t_g} \text{ to } t_{t_r-t_g+s_r-1}$$

are incremented by one (for type (b) requests SOCs will be updated for each sub-request or can be updated by value m in one shot while each sub-request is included in the reservations lists. If channels are not available, the request is rejected. Notice that channel-number-allocated is set to null as no channel is allocated to the request yet.

Resource Allocation (and Deallocation) Phase

The channel allocation process is carried out for one slot at a time in the RAP. Thus when the requests are being serviced in current time slot ($t_0$), the channel allocation process is carried out for slot ($t_1$), which will be renamed as $t_0$ at the end of the slot. All other slots also are renumbered. Thus we describe the process only with respect to slot $t_0$ and $t_1$ and the process is repeated after each slot.

There are three kinds of requests that need to be handled in the channel allocation/deallocation.

1. Request that are continuing in slot $t_1$.
2. Request that are terminating after $t_0$.
3. Request that are starting in slot $t_1$.

The first two sets of request are in a reservation list of $t_0$. The third set of requests is in a reservation list of slot $t_1$. FIG. 5 shows one exemplary method using pseudo code suitable for performing channel allocation. The process will continue the on-going requests on the same channel, remove completing requests from the lists, and then allocate new channels to requests starting in the next slot. A free channel is guaranteed to be available as the number of requests accepted for any slot is no more than the number of channels (SOC≤M).

Performance Evaluation

We now turn to a description of simulation results comparing the SSAR method according to the invention to a prior art ASAR method. We used the following parameters: the arrival process was a Poisson process with an exponentially distributed holding time, the book-ahead times of the AR requests were considered to be either constant (1440 slots) and were uniformly distributed. The horizon was relatively large (equal to 2000 timeslots). We choose a mean value of 15 time-slots for our request duration. We then simulated $10^6$ AR requests and took the average of 20 runs. We used k precomputed paths between each source-destination pair. We evaluated our heuristics on the 14-node NSFnet.

Figure 6A:
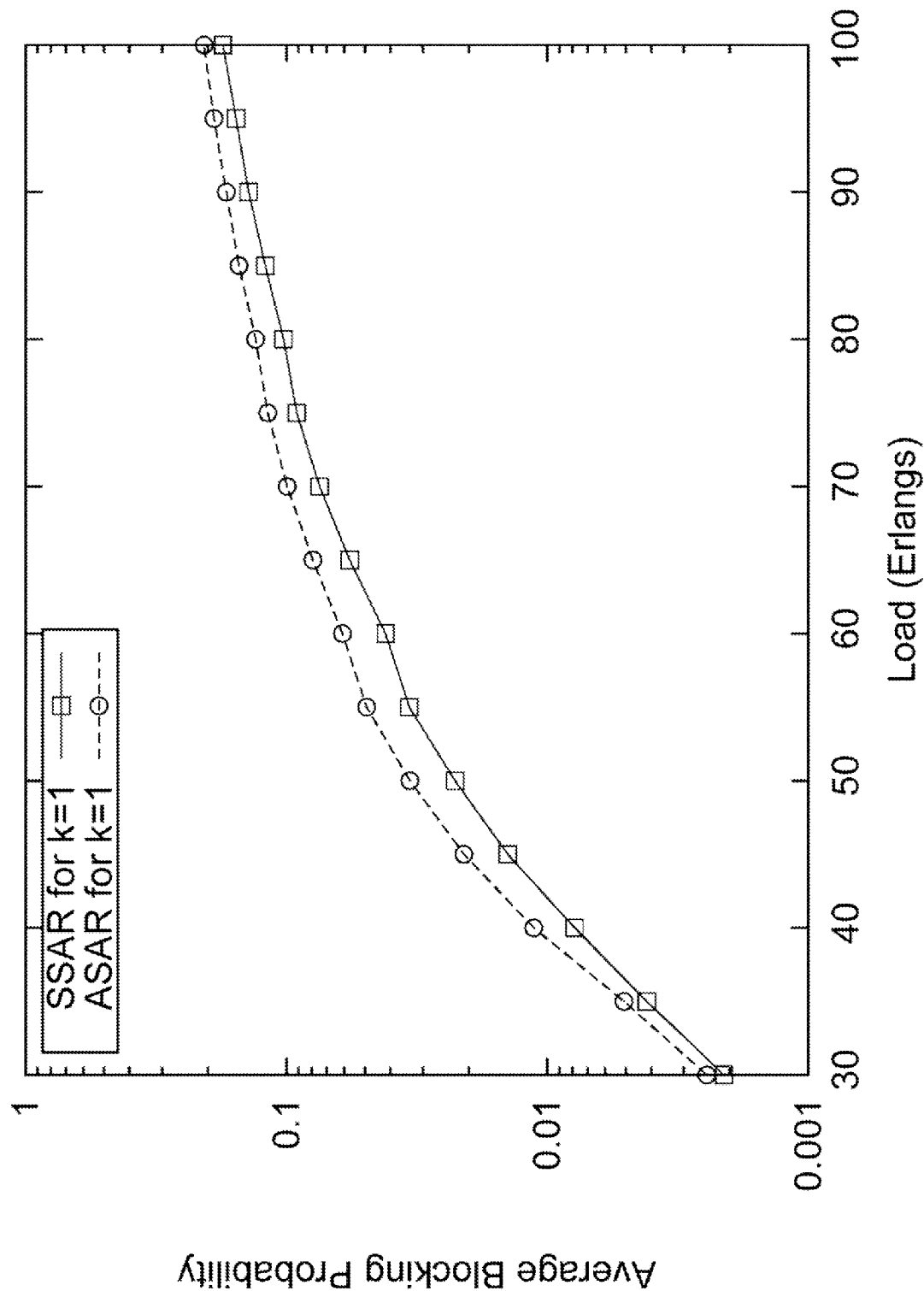
FIG. 6A shows a graph of average blocking probability for the SSAR and the ASAR methods vs. load for constant book-ahead times.
Figure 6B:
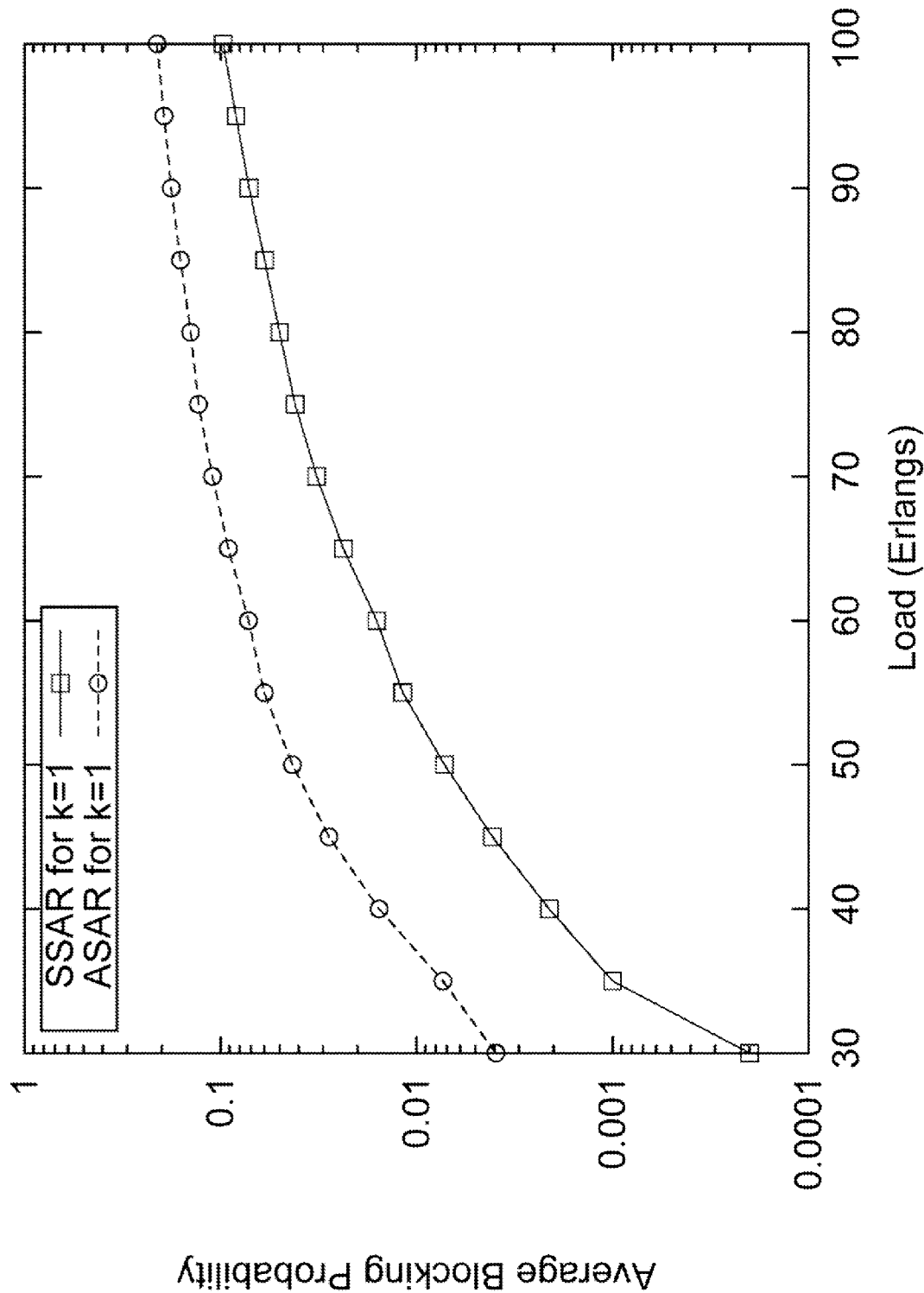
FIG. 6B shows a graph of average blocking probability for the SSAR and the ASAR methods vs. load for uniformly distributed book-ahead times.

FIG. 6A and FIG. 6B depict some initial results with k=1 path with constant and uniformly distributed book-ahead times. FIG. 6A shows a graph average blocking probability plotted versus load (Erlangs) comparing SSAR according to the invention to the ASAR method of the prior art for constant book-ahead times. FIG. 6B shows a graph average blocking probability plotted versus load (Erlangs) comparing SSAR according to the invention to the ASAR method of the prior art for uniformly distributed book-ahead times. It can be concluded from these results that the SSAR system and method performs well in comparison to the prior art ASAR method. In fact with SSAR, capacity blocking is the only reason for blocking.

In this description, we addressed the problem of scheduler scalability, signaling and response time by introducing a novel two-phase approach in solving the dynamic advance reservation routing, slot, and the wavelength assignment problem. By comparing SSAR methods according to the invention, to the ASAR method of the prior art, we conclude that SSAR process as described herein is better than the baseline heuristic. The SSAR method keeps the scheduler simple and avoids pre-allocation of bandwidth. The SSAR method according to the invention is optimal and therefore better than prior art methods for provisioning lightpaths for AR requests over WDM networks in terms of efficient scheduler state management, reduced signaling, faster response times to user requests in terms of whether requests were accepted or rejected, and centralized scheduler scalability at higher loads and for large networks. It is also contemplated that the inventive SSAR method can be extended to non-continuous advance reservation techniques.

SSAR with Time Flexibility

Demands that specify a start time and duration are denoted STSD. In some embodiments, for STSD requests with flexibility, we can implement the resource provisioning phase (RPP) and the resource allocation phase (RAP) similar to the STSD requests with fixed time. The difference is that in the RPP, the centralized scheduler tries all possible starting times in the sliding window using a first-fit mechanism. If the request finds the necessary bandwidth, the RAP phase is called at the starting time of the request.

Figure 11:
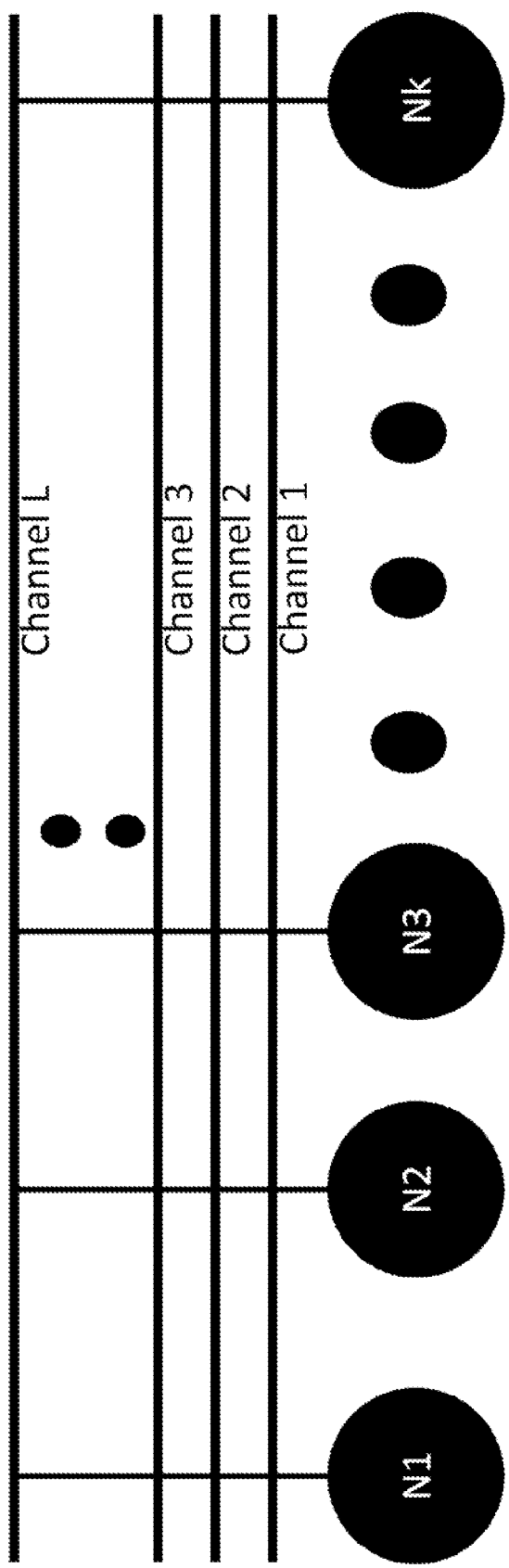
FIG. 11 shows a schematic illustration of a network where each of the nodes can transmit on any channel and where a request can be from one or more source nodes to one or more destination nodes.

The SSAR method can be applied to several different kinds of communication requests as described hereinbelow in a system in which several parallel channels are set between possible sources and destinations. One such exemplary system is shown in FIG. 11 where channels are set up in a network, such as an optical network (i.e., by finding the right paths in network). In this exemplary embodiment, each of the nodes can transmit on any channel (i.e., can use one or more channels), and a request is from one or more nodes to one or more destinations. Any node can act as a source or as a destination.

Unicast SSAR

Figure 7:
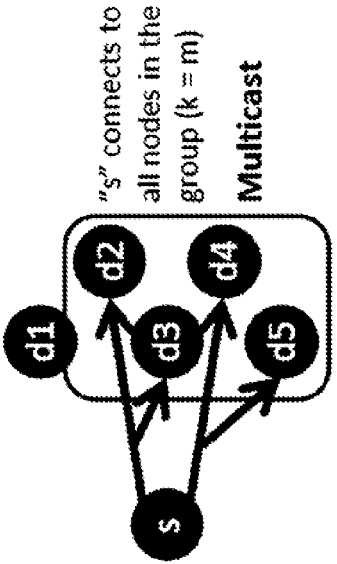
FIG. 7 shows a schematic illustration of a Unicast embodiment of a SSAR system and method according to the invention.

FIG. 7 shows a conceptual illustration of a Unicast embodiment of a SSAR system and method according to the invention. In unicast communication data is transmitted from a single source to a single destination. Our basic SSAR method supports provisioning and allocation of unicast advance reservation requests.

Multicast SSAR

Figure 8:
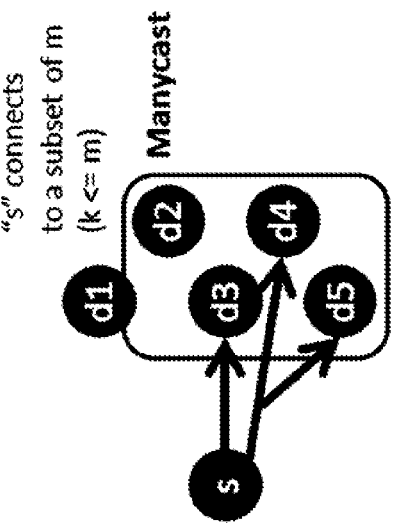
FIG. 8 shows a schematic illustration of a Multicast SSAR system and method according to the invention.

FIG. 8 shows a conceptual illustration of a Multicast SSAR system and method according to the invention. Multicast is a communication paradigm in which data is transmitted from a source to a set of destinations. In this embodiment, the SSAR process is implemented for each tree from the source to all the destinations. The final communication tree (e.g. a light-tree) (route+wavelength+slots) is set up between the source and all of the multicast destinations.

Anycast SSAR

Figure 9:
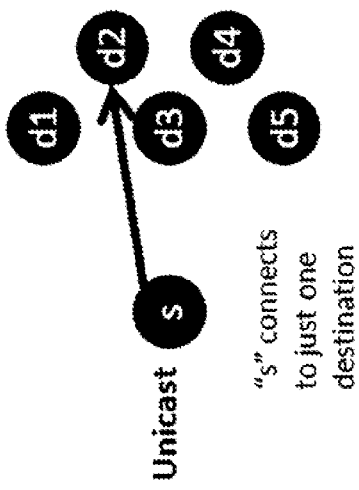
FIG. 9 shows a schematic illustration of a Anycast embodiment of a SSAR system and method according to the invention.

FIG. 9 shows a conceptual illustration of an Anycast embodiment of a SSAR system and method according to the invention. Anycast is a communication paradigm that can provide an intelligent selection of a destination node for distributed applications. Anycast refers to a transmission of data from a source to any one destination out of a set of candidate destinations. In this embodiment, the SSAR method is repeated from each source to candidate destination. The communication (e.g., light path) is set up between the source and the best destination.

Manycast SSAR

Figure 10:
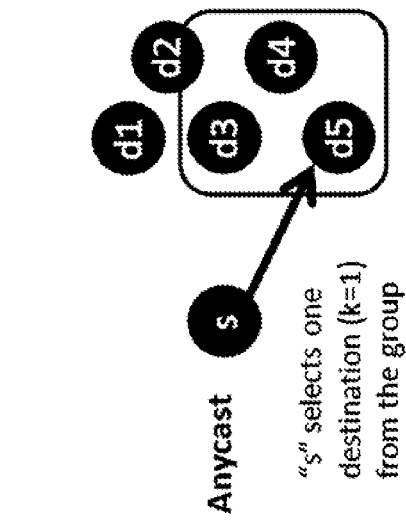
FIG. 10 shows a schematic illustration of a Manycast SSAR system and method according to the invention.

FIG. 10 shows a conceptual illustration of a Manycast SSAR system and method according to the invention. Manycasting is a more generic version (of Anycasting), which supports communication from a sender to any k out of m ($k \leq m$) candidate destinations where the candidate destination set, $|D_c|=m$, is a subset of nodes in the network. If we change the parameters of the manycast request, we can also perform unicast ($k=m=1$), multicast ($k=m>1$), and anycast ($k=1<m$). The difference between multicast and manycast is that in multicast, the destinations are specified ahead of time, whereas in manycast the destinations are chosen. This flexibility results in network resources being utilized efficiently. From an energy perspective, the energy consumption (in manycasting) can be lowered in the following ways: a source node can select the "best" destinations from the candidate destination set, thus using less transmission power. The choice of destination nodes selected can also be based on the energy of the source (renewable/non-renewable). In this context, we promote manycasting as an energy-efficient variation of multicasting.

Manycast is a communication paradigm in which data is transmitted from a source to a set of candidate destinations. In this embodiment, the SSAR process is implemented for each tree from the source to all the destinations. The final communication tree (e.g. the light-tree of an optical network) (route+wavelength+slots) is set up between the source and the all the multicast destinations.

Peer-to-Peer (P2P) SSAR

In a P2P communication paradigm, one or more sources can transmit data to one or more destinations. A P2P request is from one (or more nodes) to one or more destinations. In this embodiment, the SSAR process is implemented for each tree from one or more sources to one or more destinations. The final communication tree (e.g. the light-tree or a light-trail of an optical network) (route+wavelength+slots) is set up connecting all the sources and destinations for a given connection request.

Additional Approaches

We have also investigated the problem of provisioning lightpaths for dynamic advance reservation (AR) requests in all optical wavelength division multiplexed networks. We describe a two-phase novel routing, slot, and wavelength assignment (RWSA) technique called Non-Continuous Single-Slot Advance Reservation (NC-SSAR). We describe two NC-SSAR heuristics, one with only lightpath segmentation (SEG-NC-SSAR) and the other with lightpath segmentation and lightpath switching (LPSNC-SSAR). We briefly discuss three baseline RWSA heuristics and compare them with the described heuristics. Through extensive simulations, we show that the described NC-SSAR heuristics can solve the RWSA problem more effectively and efficiently by providing significantly lower blocking and reducing the overall signaling in the network by minimizing the number of lightpath switches, compared to the baseline RWSA heuristics.

Optical wavelength-routed WDM networks are a potential candidate for future wide-area backbone networks as well as scientific Grid networks. An optical WDM network consists of fibers connected by switches, or optical cross connects (OXCs). In order to transmit data over the network, a dedicated circuit is established when a user submits a connection request. When a connection request arrives at the network, the request must be routed over the physical topology and also assigned a wavelength. This is known as the routing and wavelength assignment (RWA) problem. The combination of a route and wavelength is known as a lightpath. The RWA problem is NP-complete; heuristics are typically used. As requests are accepted into the network, no two requests can use the same wavelength on the same link. If an arriving request cannot find a lightpath, the request is rejected and it is said to be blocked. In an all-optical WDM system, once a lightpath is setup, the signal is transmitted all-optically through the network.

We consider the dynamic traffic model, where requests arrive sequentially, according to a stochastic process and have finite holding times. The goal is to minimize request blocking, where a user's request is denied due to lack of resources. The dynamic traffic model can be further classified in to immediate reservation (IR) and advance reservation (AR). The data transmission of an IR demand starts immediately upon arrival of the request and the holding time is typically unknown. AR demands, in contrast, typically specify a data transmission start time that is sometime in the future and also specify a holding time. If a range of start times is specified, it is known as flexible advance reservation. The difference between the arrival of the request and start of the transmission is the book-ahead time. The fact that holding time and bookahead time is known by the network allows the network to efficiently optimize resource usage by maintaining state information about reserved resources.

A primary motivation for our work is large data transfers over Grid networks. A Grid network is a collection of geographically distributed resources, such as storage nodes, super computers, and scientific equipment that are accessible to users over a network. An example of a Grid is the Large Hadron Collider Computing Grid Project. These networks often deal with the transfer of large amounts of data in the Terabyte (TB) to Petebyte (PB) range.

We have investigated adding another dimension of flexibility to the advance reservation framework. In addition to allowing flexible start times, we allow non-continuous data transmission, meaning the sending application may pause transmission for a period of time and then resume later. This means the request is broken into one or more segments, which can be transmitted on different lightpaths. Instead of provisioning one large request over a single lightpath, we can provision a number of smaller segments on one or more lightpaths. We will discuss the network requirements for this in the Section titled PROBLEM DEFINITION. Traditional advance reservation can lead to resource fragmentation where small gaps in wavelength usage are unable to be utilized, as described in L.-O. Burchard et al., "Performance issues of bandwidth reservations for Grid computing," in *Symposium on Computer Architecture and High Performance Computing*, November 2003, pp. 82-90. Non-continuous transmission can help reduce fragmentation by filling these gaps.

First, we compare the continuous single-slot advance reservation (SSAR) with both traditional continuous and non-continuous procedures for both fixed and flexible advance reservations. Next, we describe our non-continuous single-slot advance reservation (NC-SSAR) and its two versions, Segmented NC-SSAR (SEG-NC-SSAR) and Lightpath switched NC-SSAR (LPS-NC-SSAR). We show that they significantly outperform existing continuous flexible advance reservation heuristics. We are the first to analyze the performance of noncontinuous RWSA for dynamic traffic without pre-allocation of user demands. We demonstrate that lightpath switching for non-continuous transmission without pre-allocation provides the best performance improvement both in terms of blocking as well as number of lightpath switches. We discuss the related work in the next Section. We present the problem statement in the Section titled PROBLEM DEFINITION. In the Section titled DYNAMIC NON-CONTINUOUS SINGLE SLOT ADVANCE RESERVATION HEURISTICS, we describe the described heuristics. We present the performance evaluation in the Section titled PERFORMANCE EVALUATION.

RELATED WORK

Advance reservation for optical networks was first described in J. Zheng et al., "Routing and wavelength assignment for advance reservation in wavelength-routed WDM optical networks," in *Proceedings, IEEE ICC*, vol. 5,2002, pp. 2722-2726. They discuss several types of advance reservation. The most commonly studied type in the literature specify a start time and duration, which is denoted by STSD (specified start, specified duration). We will further classify STSD into STSD-fixed and STSD-flexible. STSD-fixed demands specify a single possible start time, while STSD-flexible demands specify a range of start times. STSD-flexible is the type of demand we investigate in this work. There have been a number of papers that describe heuristics for STSD-fixed and STSD-flexible requests. These works consider continuous transmission. Examples include S. Figueira et al., "Advance reservation of lightpaths in optical-network based grids," in *IEEE Gridnets,* 2004, and T. D. Wallace et al., "Advance lightpath reservation for WDM networks with dynamic traffic," *OSA JON,* no. 7, pp. 913-924.

Non-continuous advance reservation was described in Y. Chen et al., "Resource allocation strategies for a non-continuous sliding window traffic model in WDM networks," in *BroadNets* 2009. They consider the static problem where all of the demands are given and each demand may be broken into smaller segments. Our work focuses on the dynamic problem, which is more appropriate for Grids. Breaking large file transfers into pieces was briefly discussed in D. Andrei et al., "On-demand provisioning of data-aggregation sessions over WDM optical networks," *IEEE/OSA Journal of Lightwave Technology*, vol. 27, no. 12, pp. 1846-1855, June 2009, but just as an extension to described procedures and it was not studied in detail. They only consider breaking the file into a fixed number of fixed sized pieces and they do not require wavelength continuity (traffic grooming is performed). S. Naiksatam et al., "Elastic reservations for efficient bandwidth utilization in LambdaGrids," *Future Gener. Comput. Syst.,* 23(1), 2007 described flexible reservations that could be segmented. They define a bandwidth-slot as the smallest unit of bandwidth a request can use. The bandwidth-slots a request uses can be spread in any way across the time-domain. They do not consider routing and wavelength assignment. They approach the problem strictly as a scheduling problem of bandwidth-slots and assume the lightpaths are already established.

The baseline to this work which discusses single slot advance reservation (SSAR) in detail with suitable comparisons to traditional heuristics, is the continuous version of the described NC-SSAR heuristic discussed in the paper. Readers are encouraged to refer to A. Somani et al., "Dynamic advance reservation with delayed allocation over wavelength-routed networks," in *Proc. of IEEE ICTON*, June 2011 for details about SSAR.

Problem Definition

We now formally define the problem. We consider dynamic traffic requests, where user requests arrive according to some stochastic process. We are given a network, G=(V, E, W, H), where V is the set of nodes, E is the set of edges, and W is the number of wavelengths per link. We assume a time-slotted network with fixed-size timeslots. We define the advance reservation horizon, H, to be the number of future timeslots for which state information is maintained. This value will limit how far ahead advance reservations can reserve network resources. There is a centralized scheduler that maintains the state information, which is updated after each request. The state information consists of which timeslots are used on all wavelengths on all edges. It can be thought of as a three-dimensional array U [E, W, H]. The user requests can be of two types based on the actual start time of the request, one with fixed start time and the other with flexible start times. The request with fixed start time R-fixed, can be defined as a four tuple, (s, d, st, $\tau$), where s$\in$V is the source node, d$\in$V is the destination node, st is the actual start time of the request, and $\tau$ is the duration of the request in timeslots. The second type of request is with flexible start times which specifies a window of start times, R-flexible can be defined as a five tuple, (s, d, left, right, $\tau$), where left specifies the earliest start time for the user request and right specifies the latest time the request can start and the rest of the parameters are same as defined in the previous request type. Upon arrival of a request, the scheduler must allocate resources to the request. The scheduler will then return a vector of segments, S, called the schedule. We define a segment as a lightpath used to transfer data between a specified start and end time. A segment can be defined as a four-tuple, (t, d, P, W), where t is the start time which refers to a specific timeslot, d is the duration which is specified in number of timeslots, P is the path, and W is the wavelength. The start time is inclusive, so the segment transmits data from [t; t+d-1]. Each segment follows the wavelength continuity constraint on all links and each new segment following a different wavelength and/or path for a particular request indicates a lightpath switch.

Instead of generating a single route and wavelength for a given request as in traditional RWA problems, our described heuristics generate a schedule of one or more segments across k-shortest paths while selecting the best wavelength according to some wavelength selection policy. We will call this routing, wavelength, and segment assignment (RWSA).

Definition of RWSA: Given a network, G=(V,E,W,H), its current state, U [E, W, H], and an incoming dynamic request R=(s, d, left, right, $\tau$), we must return a schedule, S={(ti, di, Pi, Wi)} if the request was accommodated or block the request due to unavailability of network resources. The segments should be selected in such a way that they reduce blocking of future dynamic advance reservation requests. We have the following constraints for the schedule, S:

$$1 \le |S| \le \tau \qquad \text{Rel. (1)}$$

$$1 < P_i \le k | 1 \le P_i \le W \qquad \text{Rel. (2)}$$

$$t_{left} \le t_1 \le t_{right+duration-1} \qquad \text{Rel. (3)}$$

$$\Sigma d_i = \Sigma \qquad \text{Eqn. (4)}$$

$$t_i + d_i = t_{i+1} \qquad \text{Eqn. (5)}$$

$$t_{last} \le t_{right+duration-1} \qquad \text{Rel. (6)}$$

Assume the schedule has n elements. Rel. (1) states that there must be at least one segment and there can be at most $\tau$ segments. Rel. (2) states that if we employ lightpath switching we must have at least 2, k-shortest paths or wavelengths used in the computation of the schedules. Note that if no lightpath switching is used, it suffices to have at least 1 shortest path Rel. (3) states that the first segment can start as early as the time specified by the left window and can start as late as the time specified by the right window. Eqn. (4) states that the summation of the segments durations must be equal to the duration of the request. Eqn. (5) states that each segment must start when the previous one ends in case of continuous transmission. Rel. (6) states that the last segment has to end before the its deadline.

Dynamic Non-Continuous Single Slot Advance Reservation Heuristics

We now present the dynamic non-continuous single slot routing and wavelength assignment heuristic procedures. Single Slot AR and the concept of delayed allocation have been discussed in detail hereinabove. Our procedures employ a static k-shortest path route computation, which is computed using the procedure discussed in J. Yen, "Finding the k shortest loopless paths in a network," *Management Science*, vol. 17, no. 11, pp. 712-716, 1971. The procedures can be classified as follows: non-continuous single slot AR with segmentation (SEG-NC-SSAR) and non-continuous single slot AR with lightpath switching (LPS-NC-SSAR). In what follows, we first show with the help of an example, the benefit of noncontinuous transmission as compared to continuous transmission in terms of single slot advance reservation technique and then formally describe the procedures.

Non-Continuous Single Slot Advance Reservation

The NC-SSAR procedures aim to reduce the number of lightpath switches while significantly improving the blocking performance. Due to reduced lightpaths switches the overall signaling is reduced in the network. NC-SSAR procedures follow the SSAR nature of completely avoiding pre-allocation of requests by not allocating resources until the scheduler clock has moved to one timeslot previous to the timeslot requested for by the request, which may be the start time of the request (case a) or continuation of the same request (case b) until its completion. Irrespective of the case under consideration, allocation is dealt on a single slot basis. Thus we assume in the example described below, all the slots which are shown as allocated are for requests which have either started or are continuing and the allocation is happening on a single slot basis. This delayed allocation in turn reduces the scheduler space complexity (simpler data structure) as discussed hereinabove.

Figure 12:
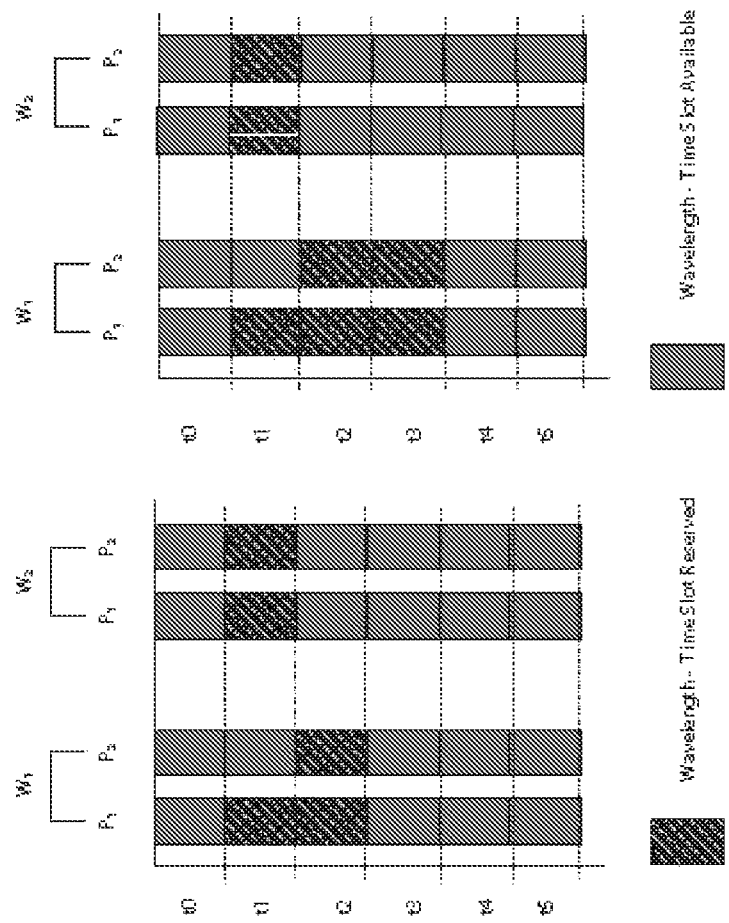
FIG. 12 is an NC-SSAR illustration.

As shown in FIG. 12 there are two different scenarios showing timeslot availability and reservation information on the four lightpaths $W_1P_1$, $W_1P_2$, $W_2P_1$, and $W_2P_2$ available between a source-destination pair. Let us consider the first scenario (left hand side of the figure) and assume that a user request arrived at $t_0$ at the centralized scheduler wanting to start at time $t_1$ and specifies 2 timeslots of duration as its holding time, along with a deadline specification of 3 timeslots from and inclusive of the starting timeslot $t_1$. Now the scheduler running continuous SSAR procedure or any continuous procedure would have been able to provision just one timeslot, i.e., $t_1$ on $W_1P_2$, as there is no continuing timeslot availability on any of the wavelength paths as can be seen by observation and thus the request would have been blocked. However, Segmented NC-SSAR overcomes that disadvantage as it is able to provision the other pending duration on the same wavelength path $W_1P_2$ at non-continuous timeslot $t_3$ without switching lightpath to any of the paths on $W_2$ at time $t_2$ in an effort to remain continuous in time. In effect Segmented NC-SSAR reduces lightpath switching and reduces the blocking of user requests. However in the second scenario (right hand side of the figure) the request could not have been possibly be accepted as in this case even $t_3$ on $W_1P_2$ is occupied. Thus there needs to be a lightpath switch in this case to be able to accommodate this request and the Non-Continuous Lightpath switched SSAR is used in this case to provision the second and last pending duration on time slot $t_2$ on either of the paths on $W_2$. Thus LPS-NC-SSAR improves blocking performance while reducing blocking. The reduced lightpath switching as compared to other traditional non-continuous advance reservation heuristics is brought about by keeping the horizon to just one time slot and avoiding the need for pre-allocation completely as mentioned in depth in the description for avoiding pre-allocation of advance reservation requests. We outline the Segmented NCSSAR (SEG-NC-SSAR, Procedure 1) and lightpath switched NC-SSAR (LPS-NC-SSAR, Procedure 2) heuristic procedures below.

---

Procedure 1: Segmented NC-SSAR

---

Input: R = (s, d { c(i)},τ), G = (V, E, W, H), U[E, W, H]
Output: Bool accepted, blocked,Schedule, S = {(t, τ, P, W)}
1   schedule = φ
2   First phase called resource provisioning phase (RPP) keeps track of the count of free wavelengths available on every time slot t and cheeks for availability of number of wavelengths on each time slot required by the request in non-continuous timeslots in order to successfully complete the request. If enough wavelengths available then return accepted or blocked
3   then
4   Second phase request allocation phase (RAP) finds the actual lightpath and prepares a schedule on which the request is transmitted
5   for w = 1 to W do
6      for k = 1 to K do
7         if available($P_k$, w, $t_{now}$) ≥ τ and lowest index then
8            schedule = ($t_{now}$, τ, $P_k$, w)
9   return schedule

---

Procedure 2: Lightpath Switched NC-SSAR

---

Input: R = (s, $d_c$(i),α, τ, w), G = (V, E, W, H), U[E, W, H]
Output: Bool accepted, blocked,Schedule, S = {($t_i$, $d_i$, $P_i$, $W_i$)}
1   schedule = φ
2   First phase called resource provisioning phase (RPP) keeps track of the count of free wavelengths available on every time slot t and checks for availability of number of wavelengths on each timeslot required by the request in non-continuous timeslots on different channels in order to successfully complete the request. If enough wavelengths available then return accepted or blocked
3   then
4   Second phase request allocation phase (RAP) finds the actual lightpath and prepares a schedule on which the request is transmitted

| Procedure 2: Lightpath Switched NC-SSAR |
| --- |
| 5    then |
| 6    for w in W do |
| 7        for k in K do |
| 8            validTimes = findFreeTimes(schedule) |
| 9            for v in validTimes do |
| 10              find segments for $P_k$, w between [v.start, v.end] |
| 11              insert segments into schedule |
| 12    return schedule |

Performance Evaluation

We now provide the simulation results for our described heuristics. We have used the following parameters: request arrival is a Poisson process with an exponentially distributed holding time. The horizon is large enough (equal to 2000 timeslots) so that none of the requests are blocked due to their holding time. The time slot size vastly depends upon the type of traffic that a network operator expects. It could be configured by the operator to range from seconds to hours. In our simulations we choose a value of 10 units for our time-slot size. The primary performance metric is the average blocking probability of a connection, which is defined as the fraction of connections that cannot be scheduled. We also determine in our simulations, the average number of lightpath switches defined as the ratio of number of lightpath switches to the number of successfully switched requests. We simulate 105 requests and take the average of 10 runs. We use different values of k (k=1 ... 3) for pre-computing shortest paths using Yen's k-shortest path procedure. We evaluate our heuristics on the 14-node NSFnet.

Figures 13A, 13B:
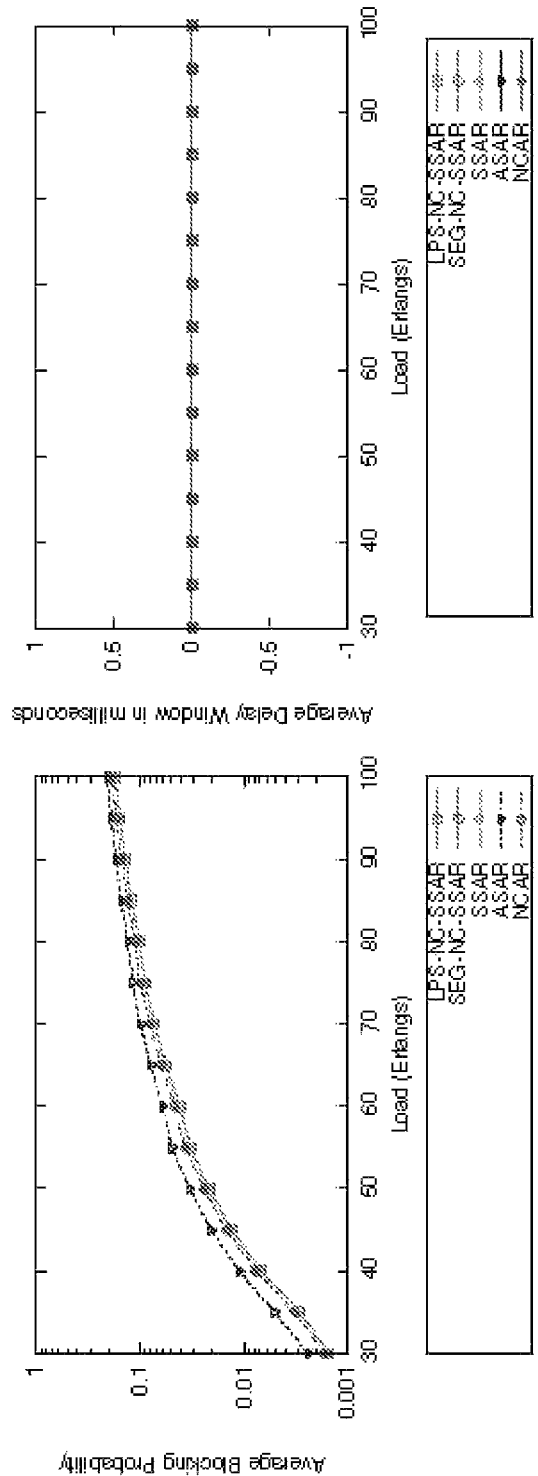
FIG. 13A is a graph showing a comparison of heuristics for constant bookahead times without flexibility and k=1 for Average Blocking Probability for AR requests.
FIG. 13B is a graph showing a comparison of heuristics for constant bookahead times without flexibility and k=1 for Average Start Delay for AR requests.
Figures 13C, 13D:
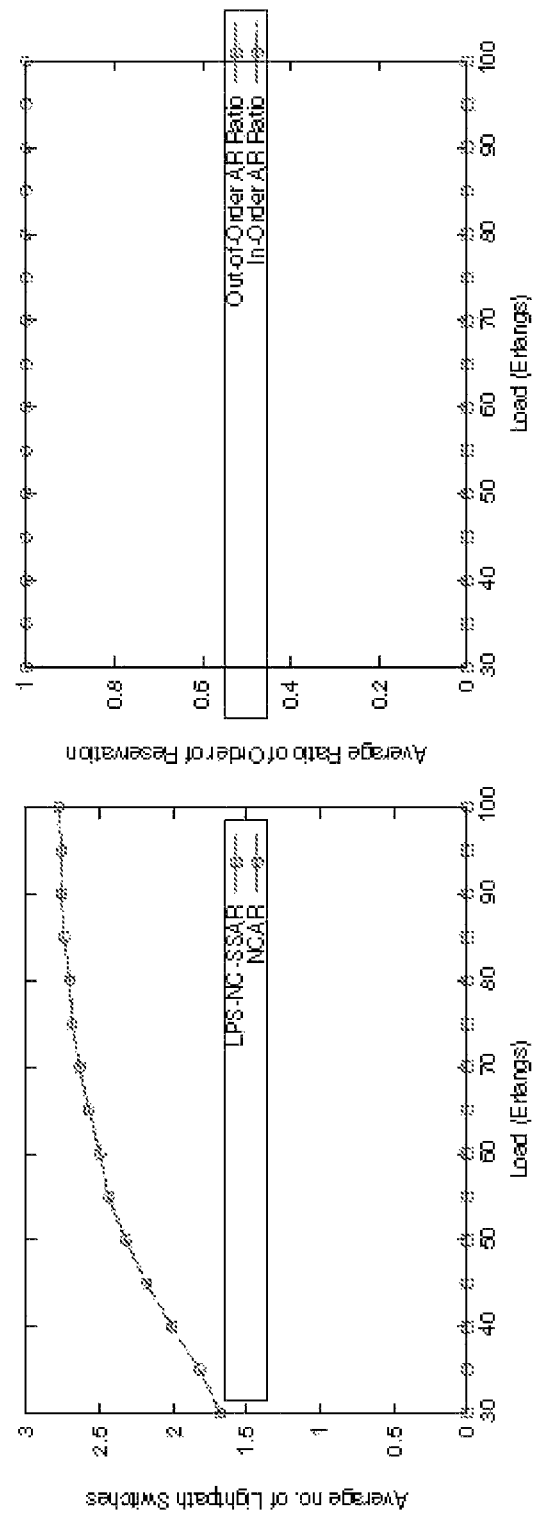
FIG. 13C is a graph showing a comparison of heuristics for constant bookahead times without flexibility and k=1 for Average Lightpath switches for AR requests.
FIG. 13D is a graph showing a comparison of heuristics for constant bookahead times without flexibility and k=1 for Out-of-order measure for AR requests.
Figures 14A, 14B:
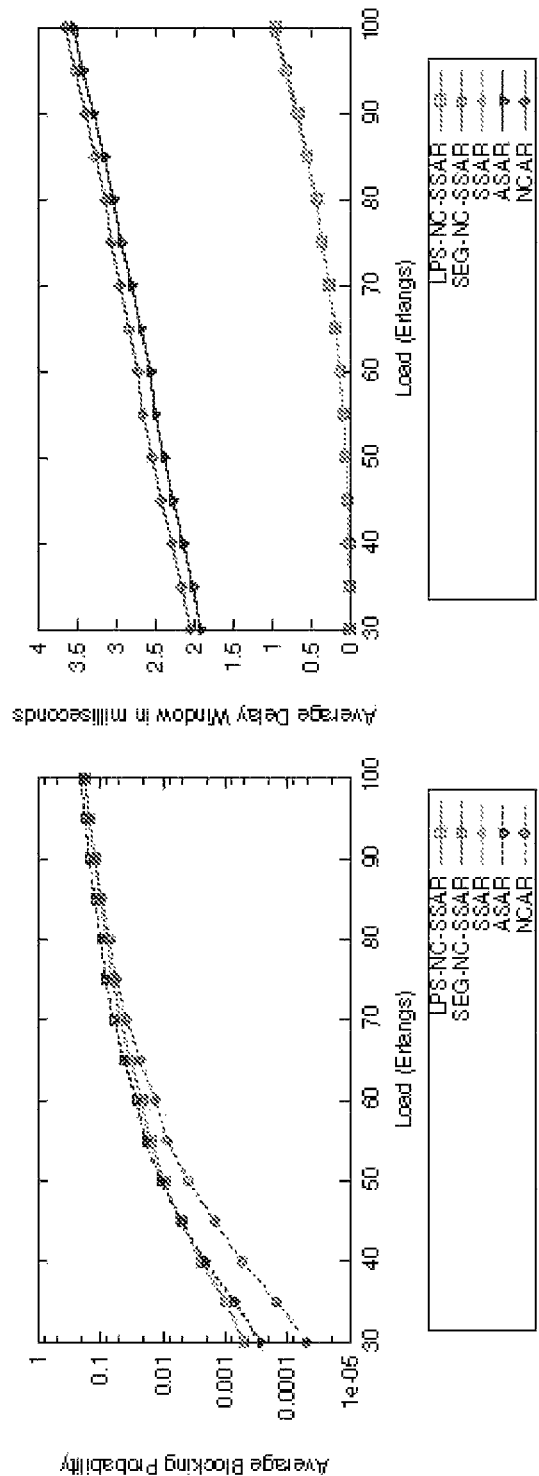
FIG. 14A is a graph showing a comparison of heuristics for constant bookahead times with flexibility and k=1 for Average Blocking Probability for AR requests.
FIG. 14B is a graph showing a comparison of heuristics for constant bookahead times with flexibility and k=1 for Average Start Delay for AR requests.
Figures 14C, 14D:
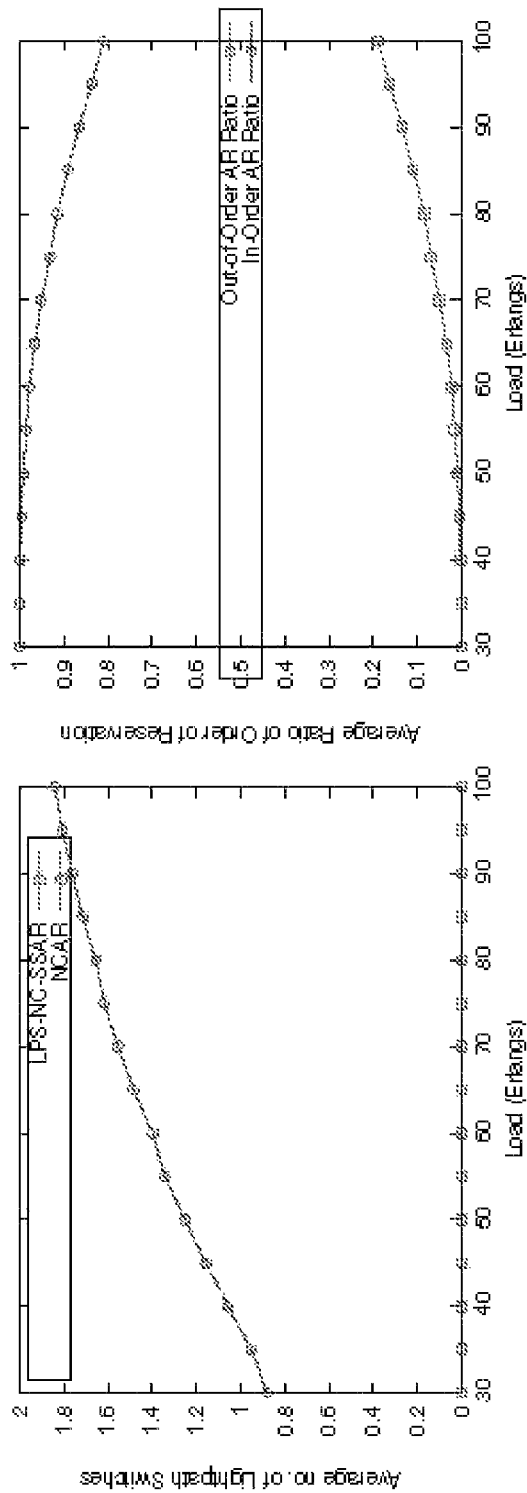
FIG. 14C is a graph showing a comparison of heuristics for constant bookahead times with flexibility and k=1 for Average Lightpath switches for AR requests.
FIG. 14D is a graph showing a comparison of heuristics for constant bookahead times with flexibility and k=1 for Out-of-order measure for AR requests.

We first discuss how the heuristics behave under constant bookahead times with and without flexibility. As shown in FIG. 13A the blocking probability of SSAR and the two non-continuous heuristics described LPS-NC-SSAR, SEG-NCSSAR perform almost identically and are about 10-20% better in blocking performance than the traditional heuristics continuous (ASAR) and non-continuous with lightpath switching (NCAR). In FIG. 13B we show that without flexibility the starting delay is zero and has no impact on the blocking performance. FIG. 13C LPS-NC-SSAR has zero lightpath switches whereas the traditional NCAR has an average of 1.6 to 2.75 lightpath switches which justifies the fact that NC-SSAR significantly reduces signaling in the network by reducing the lightpath switches to a near zero but with a better blocking performance. The out-of-order metric which gives the number of accepted requests which were out-oforder in terms of start times is zero as the book ahead times between any two requests is a constant and thus leads to sequential start times which results in in-order AR ratio to be 1 and out-of-order AR ratio to be 0 as shown in FIG. 13D. Next we introduce flexibility to the equation which leads to the following observations. As shown in FIG. 14A we observe that both ASAR and NCAR have marginally better blocking performance at lower loads than the described noncontinuous heuristics. This is due to the fact that both ASAR and NCAR pick the best wavelength path based on the packed wavelength wavelength-selection policy (refer to N. Charbonneau et al., "Dynamic non-continuous advance reservation over wavelength-routed networks," in 20*th IEEE ICCCN* 2011 for details). Packing the wavelength results in selecting the best wavelength timeslots leads to the marginal improvement in blocking performance while SSAR and NC-SSAR heuristics have a slightly higher blocking rate than NCAR and ASAR. This is because the continuous and non-continuous SSAR heuristics pick the earliest available wavelength timeslot which may not lead to optimal wavelength assignment and thus marginally increasing the chances of the request being blocked. On the other hand at higher loads, SSAR, LPS-NC-SSAR, and SEG-NC-SSAR perform identical or slightly better than the baseline heuristics ASAR and NCAR. This betterment in blocking performance at higher loads is facilitated by the delayed allocation in the second phase inherent to the continuous and non-continuous SSAR heuristics which is brought about by the introduction of flexibility in turn causing an increase in out-of-order requests as shown in FIG. 14D which helps in better provisioning lightpaths to requests at higher loads. The start delay or delay window for SSAR, LPS-NC-SSAR, and SEG-NC-SSAR is significantly lower (about 75%) than the baseline heuristics as shown in FIG. 14B while keeping the no. of lightpath switches to zero thereby reducing the effective signaling in the network as shown in FIG. 14C.

Figures 15A, 15B:
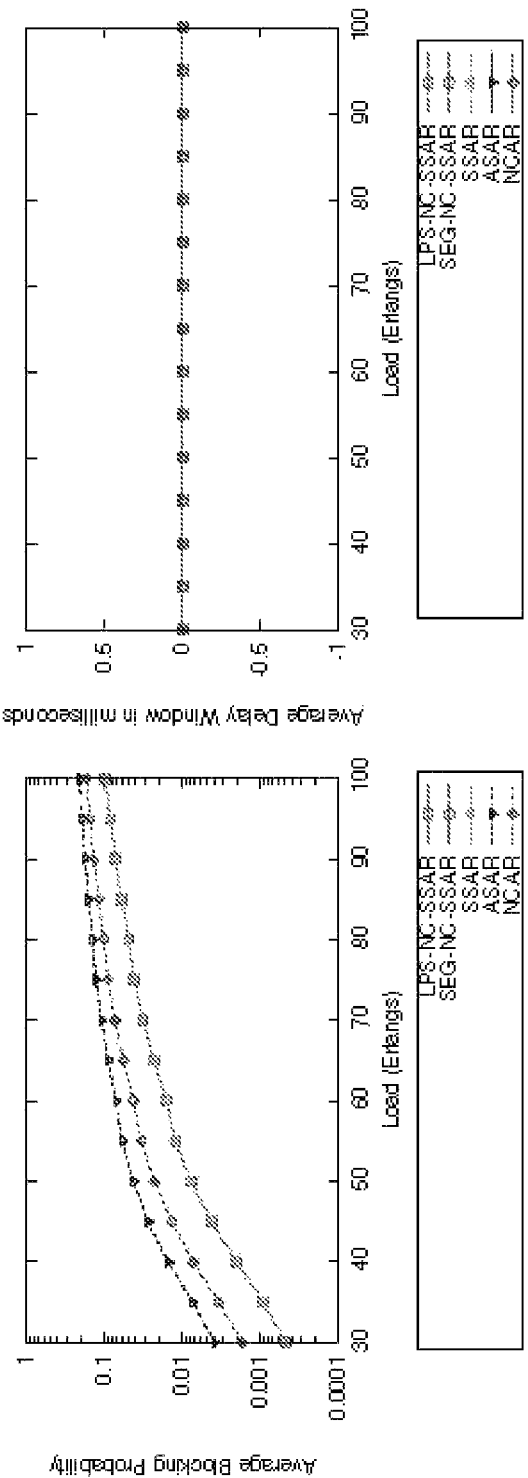
FIG. 15A is a graph showing a comparison of heuristics for uniformly random bookahead times without flexibility and k=1 for Average Blocking Probability for AR requests.
FIG. 15B is a graph showing a comparison of heuristics for uniformly random bookahead times without flexibility and k=1 for Average Start Delay for AR requests.
Figures 15C, 15D:
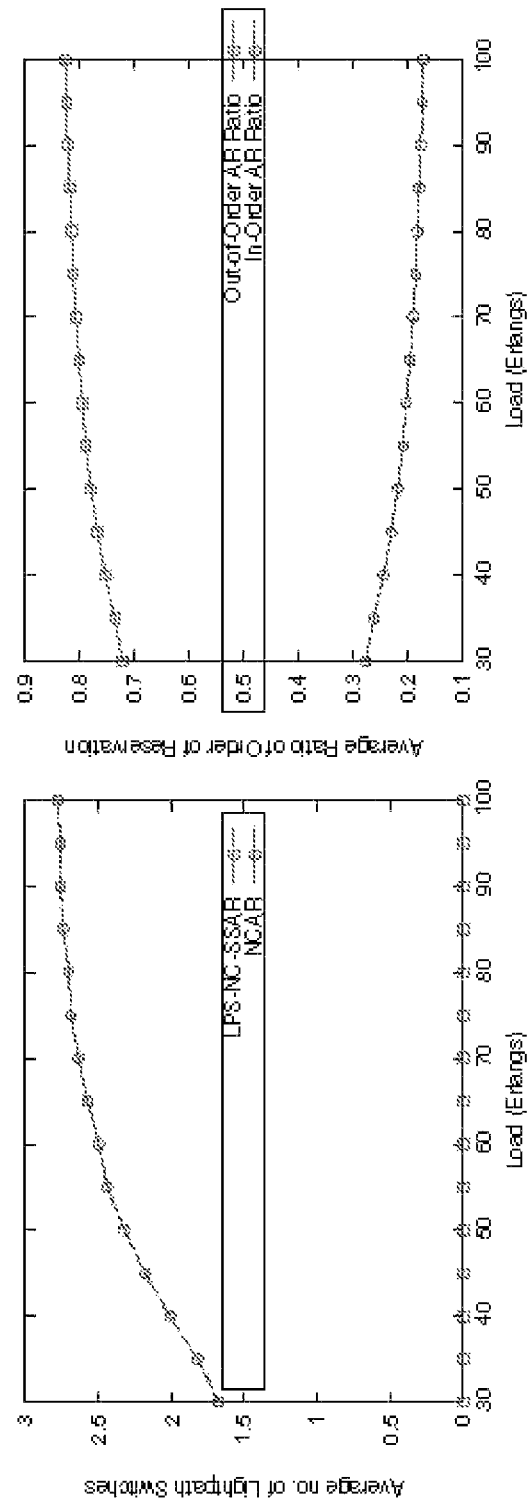
FIG. 15C is a graph showing a comparison of heuristics for uniformly random bookahead times without flexibility and k=1 for Average Lightpath switches for AR requests.
FIG. 15D is a graph showing a comparison of heuristics for uniformly random bookahead times without flexibility and k=1 for Out-of-order measure for AR requests.
Figures 16A, 16B:
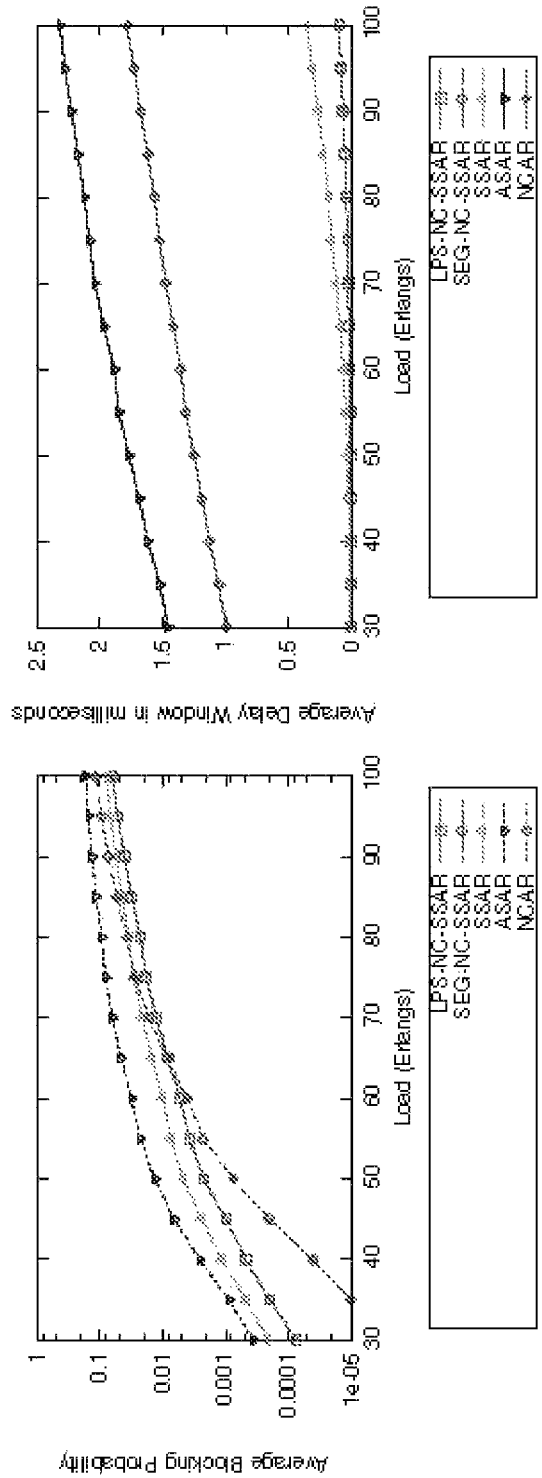
FIG. 16A is a graph showing a comparison of heuristics for uniformly random bookahead times with flexibility and k=1 for Average Blocking Probability for AR requests.
FIG. 16B is a graph showing a comparison of heuristics for uniformly random bookahead times with flexibility and k=1 for Average Start Delay for AR requests.
Figures 16C, 16D:
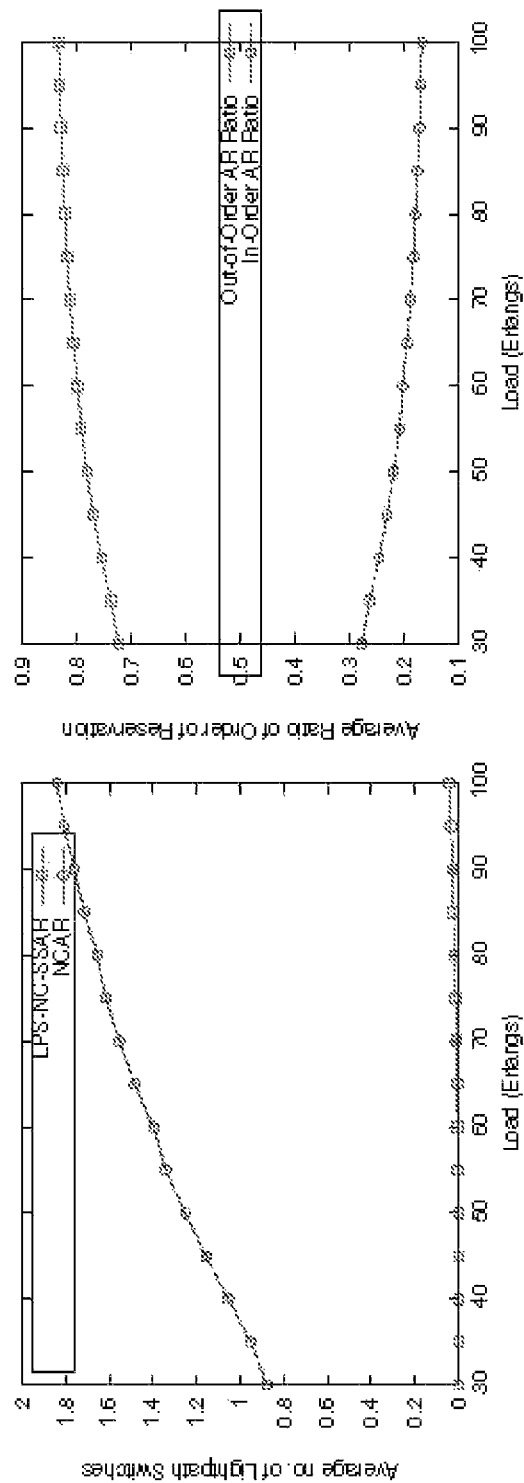
FIG. 16C is a graph showing a comparison of heuristics for uniformly random bookahead times with flexibility and k=1 for Average Lightpath switches for AR requests.
FIG. 16D is a graph showing a comparison of heuristics for uniformly random bookahead times with flexibility and k=1 for Out-of-order measure for AR requests.

In small networks and in ideal scenarios the bookahead time for AR requests might be constant to avoid channel contentions. But in reality and in large networks this is hardly the case where requests arrive and more importantly start at random times. Thus we take into consideration when bookahead times are uniformly random which depicts the requests in real and large networks. As shown in FIG. 15A the blocking probability of SSAR and LPS-NC-SSAR, SEG-NCSSAR heuristics perform almost identical to each other and are consistently and significantly about 50-60% better in blocking performance than ASAR and NCAR. This performance improvement in blocking is brought about by significant increase in out-of-order requests as shown in FIG. 15D coupled with the delayed allocation offered by the SSAR and NC-SSAR heuristics which leads to efficient channel allocation with zero lightpath switching as shown in FIG. 15C. Thus reducing signaling in the network due to lightpath switching to a near zero while significantly increasing the blocking performance. Next, we introduce flexibility to the AR requests. This leads to the following observations. As shown in FIG. 16A we observe that SSAR and NC-SSAR heuristics improve blocking performance by more than 30% at high loads and are marginally lower in terms of blocking performance at low loads compared to the baseline heuristics. For SSAR and the described LPSNC-SSAR, SEG-NC-SSAR heuristics the delay window or the start delay as shown in FIG. 16B is extremely less when compared to the baselines as the timeslot allocation is done without any wavelength optimization policy for the earliest timeslot available. At higher loads the described heuristics LPS-NC-SSAR, SEG-NC-SSAR lead to significantly lower blocking as the delayed allocation aids in better selecting the wavelength and helps accommodating relatively smaller requests on channels with fewer timeslots and relatively larger requests on channels with larger availability of timeslots which is implied by the increase in out-of-order arrivals and their accommodation as shown in FIG. 16D while decreasing the lightpath switching to a near zero as shown in FIG. 16C. We can also observe from all the blocking probability graphs that without flexibility the described heuristics perform significantly and consistently better at all loads due to packing of requests at the earliest available timeslot with delayed allocation, but with flexibility at lower loads the baseline heuristics perform marginally better as the selection of the best wavelength slot is possible due to packing of the wavelengths and using the entire flexibility window while pre allocating requests which leads to increased blocking at higher loads and increased lightpath switches which contributes to increased signaling in the network. Also, for large-scale networks with heavy traffic, LPS-NC-SSAR is the ideal candidate as it reduces lightpath switching to a near zero when compared to three plus recorded for NCAR and has significantly lower blocking probability when compared to rest of the heuristics. Results for k=2 and 3 have been obtained but are omitted here.

We have addressed the problem of increased blocking due to preallocation, signaling overhead due to lightpath switches, and increased start delays. by introducing a novel single-slot non-continuous AR routing, wavelength, and slot assignment mechanism. We discussed the merits of both the versions of NC-SSAR and compared them to the traditional continuous and non-continuous RWSA heuristics. We conclude that the described NC-SSAR heuristics are the best candidates for provisioning lightpaths for AR requests over optical WDM networks as it successfully overcomes the above stated problems and is significantly better than the baseline heuristics.

DEFINITIONS

CHANNEL: A channel as used herein refers to a data transmission media. One example of a channel is a single wavelength range of a wavelength division multiplexed (WDM) optical communication system. For example, a single fiber of a bundle of fibers in an optical communication system typically has a number of designated wavelength ranges, each wavelength range providing a unique channel as defined herein. A channel also includes a RF frequency (e.g. a RF carrier having some RF bandwidth) and a RF transmission having subcarriers, each subcarrier having a RF bandwidth.

PATH: A path includes a transmission path from a source to a destination (generally a geographic source and destination). In an optical communication system, a path can include, for example, one continuous fiber, or any number of fibers including active and/or passive switching and/or another suitable signal splicing techniques. There can be multiple paths between a given source and destination. The paths can be substantially co-located (e.g. parallel fiber cables) or can run through completely different physical paths (e.g. optical fiber cables run through different cities).

Recording the results from an operation or data acquisition, such as for example, recording results of a particular data transmission scheduling method is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording data transmission scheduling data for later use (e.g., writing data transmission scheduling data to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing data transmission scheduling data to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method of scheduling data transmissions from a source to a destination, comprising the steps of:
   providing:
      a communication system having a number of channels and a number of paths, each of said channels having a plurality of designated time slots, and
      a bandwidth defined as said number of channels multiplied by said number of paths, and
      a bandwidth capacity defined as said bandwidth multiplied by said number of designated time slots;
   receiving two or more data transmission requests, each of said two or more data transmission requests designating a transmission of data from a source to a destination, each of said two or more data transmission requests including a requested start time TS of transmission and a requested number of time slots for said transmission of said data;
   provisioning said transmission of said data corresponding to each of said two or more data transmission requests via said communication bandwidth without designating a channel of said number of channels and without designating a path of said number of paths;
   receiving data corresponding to at least one of said two or more data transmission requests;
   waiting until a current time within a time interval t of an earliest requested start time TS of said two or more data transmission requests;
   allocating at said current time each of said two or more data transmission requests to a channel of said number of channels and to a path of said number of paths in a way which optimizes a use of said bandwidth capacity;
      transmitting said data corresponding to said at least one of said two or more data transmission requests that has been allocated on said allocated channel and said allocated path; and
      repeating said steps of waiting, allocating, and transmitting until each of said two or more data transmission requests that have been provisioned for a transmission of data is satisfied.

2. The method of scheduling data transmissions from a source to a destination of claim 1, wherein said step of provisioning said transmission comprises provisioning said transmission of said data during a request provisioning phase.

3. The method of scheduling data transmissions from a source to a destination of claim 1, wherein said step of allocating comprises allocating at least one of said two or more data transmission requests during a request allocation phase.

4. The method of scheduling data transmissions from a source to a destination of claim 1, wherein said step of providing a communication bandwidth is performed using an optical communication network.

5. The method of scheduling data transmissions from a source to a destination of claim 4, wherein said step of providing an optical communication network is performed using an optical communication network having wavelength division multiplexed transmission capability.

6. A system for provisioning data transmission from a source to a destination, comprising:
   a communication system having a number of channels and a number of paths, each of said channels having a plurality of designated time slots, in which a communication bandwidth is defined as the product of said number of channels times said number of paths and a bandwidth capacity is defined as the product of said bandwidth times said number of designated time slots; and
   a processor having instructions provided on a machine readable medium, said processor configured to perform the following steps when said instructions are operative:
      determining said communication bandwidth and said bandwidth capacity;
      receiving two or more data transmission requests, each of said two or more data transmission requests designating a transmission of data from a source to a destination, each of said two or more data transmission requests including a requested start time TS of transmission and a requested number of time slots for said transmission of said data;

provisioning said transmission of said data corresponding to each of said two or more data transmission requests via said communication bandwidth without designating a channel of said number of channels and without designating a path of said number of paths;

receiving data corresponding to at least one of said two or more data transmission requests;

waiting until a current time within a time interval t of an earliest requested start time TS of said two or more data transmission requests;

allocating at said current time each of said two or more data transmission requests to a channel of said number of channels and to a path of said number of paths in a way which optimizes a use of said bandwidth capacity;

transmitting said data corresponding to said at least one of said two or more data transmission requests that has been allocated on said allocated channel and said allocated path; and repeating said steps of waiting, allocating, and transmitting until each of said two or more data transmission requests that have been provisioned for a transmission of data is satisfied.

7. The method of scheduling data transmissions from a source to a destination of claim 1, wherein said step transmitting said data is performed between a specified source and a specified destination.

8. The method of scheduling data transmissions from a source to a destination of claim 1, wherein said step transmitting said data is performed between a specified source and any one destination out of a set of candidate destinations.

9. The method of scheduling data transmissions from a source to a destination of claim 1, wherein said step transmitting said data is performed between a specified source and a plurality of specified destinations.

10. The method of scheduling data transmissions from a source to a destination of claim 1, wherein said step transmitting said data is performed between a specified source and a plurality of candidate destinations.

* * * * *